(12) United States Patent
Voelker et al.

(10) Patent No.: US 10,718,498 B1
(45) Date of Patent: Jul. 21, 2020

(54) RECESSED FLAT PANEL SLOT LUMINAIRE

(71) Applicant: Eaton Intelligent Power Limited, Dublin (IE)

(72) Inventors: Christopher Voelker, Lexington, KY (US); Michael Troy Winslett, Fairburn, GA (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 16/285,054

(22) Filed: Feb. 25, 2019

(51) Int. Cl.
| | | |
|---|---|---|
| *F21V 21/04* | (2006.01) | |
| *F21V 17/16* | (2006.01) | |
| *F21V 13/04* | (2006.01) | |
| *F21V 21/088* | (2006.01) | |
| *F21V 21/34* | (2006.01) | |
| *F21Y 115/10* | (2016.01) | |
| *H01R 25/14* | (2006.01) | |
| *F21V 21/005* | (2006.01) | |

(52) U.S. Cl.
CPC ............ *F21V 21/045* (2013.01); *F21V 13/04* (2013.01); *F21V 17/16* (2013.01); *F21V 21/005* (2013.01); *F21V 21/088* (2013.01); *F21V 21/34* (2013.01); *H01R 25/142* (2013.01); *F21V 2200/00* (2015.01); *F21V 2200/20* (2015.01); *F21Y 2115/10* (2016.08)

(58) Field of Classification Search
CPC ......... F21S 8/026; F21S 8/02; F21V 2200/20; F21V 21/005; F21V 21/088; F21V 21/047; F21V 21/048; F21V 21/049
See application file for complete search history.

(56) References Cited

U.S. PATENT DOCUMENTS

| | | | |
|---|---|---|---|
| 4,999,755 A | 3/1991 | Lin | |
| 8,926,134 B2 | 1/2015 | Hast | |
| 9,388,969 B2* | 7/2016 | Doubek | ............... F21V 17/164 |
| 9,506,631 B2 | 11/2016 | Erhard | |
| 9,565,769 B2 | 2/2017 | Dankelmann | |
| 2007/0285949 A1 | 12/2007 | Lodhie | |
| 2009/0244909 A1 | 10/2009 | Chen | |
| 2010/0271834 A1 | 10/2010 | Muessli | |
| 2012/0106135 A1* | 5/2012 | Chen | ......................... F21S 8/04 362/147 |
| 2013/0021791 A1 | 1/2013 | Hsu | |
| 2013/0322110 A1* | 12/2013 | Cantu | ................... F21V 33/006 362/602 |

(Continued)

*Primary Examiner* — William N Harris
(74) *Attorney, Agent, or Firm* — King & Spalding LLP

(57) ABSTRACT

A luminaire includes a light transmission unit and a light source that are disposed in a housing assembly of the luminaire such that light emitted from the light source enters a lightguide panel of the light transmission unit through an edge of the lightguide panel and exits the lightguide panel through a surface of the lightguide panel that is substantially perpendicular to the edge. A length of the luminaire along its long side is greater than a width of the luminaire along its short side, while a height of the luminaire with or without any appropriate electronic component that is mounted thereto is less than the width of the luminaire as well as a width of an aperture of a recessed installation structure, such as a T-grid frame or a drywall frame, through which the luminaire is to be installed. The luminaire includes grid clips for recessed installation.

18 Claims, 32 Drawing Sheets

(56) References Cited

U.S. PATENT DOCUMENTS

| | | | |
|---|---|---|---|
| 2014/0036503 A1* | 2/2014 | Olsen | F21S 8/026 362/249.02 |
| 2014/0098564 A1* | 4/2014 | Magnan | F21K 9/61 362/606 |
| 2016/0018092 A1 | 1/2016 | Knaapen | |
| 2016/0033098 A1 | 2/2016 | Bergman | |
| 2016/0033099 A1 | 2/2016 | Bergman | |
| 2016/0363710 A1* | 12/2016 | Van Boven | F21S 8/04 |
| 2017/0009942 A1* | 1/2017 | Myers | F21S 8/026 |
| 2017/0242177 A1* | 8/2017 | Howe | G02B 6/0021 |
| 2018/0031212 A1* | 2/2018 | Nguyen | F21V 21/04 |
| 2018/0128434 A1* | 5/2018 | Moon | G02B 6/0088 |
| 2019/0339445 A1* | 11/2019 | Hawthorne | G02B 6/0091 |

\* cited by examiner

;# RECESSED FLAT PANEL SLOT LUMINAIRE

TECHNICAL FIELD

Embodiments of the present disclosure relate generally to luminaires, and more particularly to a recessed flat panel slot luminaire.

BACKGROUND

Conventional flat panel slot luminaires (hereinafter 'conventional slot luminaire') are typically backlit, i.e., a lens or a diffuser panel of the luminaire is illuminated from behind by a light source. One constraint with backlit conventional slot luminaires is there are limits to the minimum achievable thickness of the luminaire because there needs to be some space between the light source and the lens or diffuser to provide even illumination from the luminaire without prominent areas that are brighter (known as hot spots) than other areas. The addition of drivers and other such electronic components (e.g., ballast) to the conventional slot luminaires further increases a combined thickness of the conventional slot luminaires. The combined thickness of the conventional slot luminaires, i.e., the thickness of the conventional flat panel slot luminaires with the drivers or other such electronic components may be larger than a width of an aperture of a recess installation structure, e.g., T-grid aperture, through which the conventional slot luminaires are to be inserted for installation (e.g., recessed installation), which inhibits the ability to insert and install the conventional slot luminaires from underneath and through the aperture. Therefore, the conventional slot luminaires have to be installed from above the recess installation structure which may be inconvenient and time-intensive.

For example, to install a conventional slot luminaire in a T-grid frame, an installer may have to remove a drop ceiling panel that is adjacent to an aperture defined by the T-grid frame in which the conventional slot luminaire is to be installed. Removing the drop panel ceiling adjacent the aperture creates an opening that is large enough to pass the conventional slot luminaire therethrough. After removing the drop ceiling panel, in said example, the installer has to insert the conventional slot luminaire through the opening that is adjacent the aperture defined by the T-grid frame, position the conventional slot luminaire above the aperture defined by the T-grid frame, install the conventional slot luminaire in the T-grid frame from above the frame, and return the drop ceiling panel to its position adjacent the aperture.

This background information is provided to reveal information believed to be of possible relevance to the present disclosure. No admission is necessarily intended, nor should be construed, that any of the preceding information constitutes prior art against the present disclosure.

SUMMARY

In one aspect, the present disclosure relates to a luminaire that includes a housing assembly that defines an inner cavity and a light emitting opening. The housing assembly has a long side that defines a length of the luminaire and a short side that defines a width of the luminaire. Further, the luminaire includes a light assembly that is disposed in the inner cavity of the housing assembly. The light assembly includes a light source and a light transmission unit that are arranged such that light from the light source enters a lightguide panel of the light transmission unit through an edge of the lightguide panel and exits the luminaire through a major surface of the lightguide panel that is substantially perpendicular to the edge and through the light emitting opening of the housing assembly. Furthermore, the luminaire includes grid clips disposed on the housing assembly of the luminaire such that the luminaire is configured for a recessed installation. The luminaire is configured such that the length of the luminaire is greater than the width of the luminaire, while a height of the luminaire measured from a bottom surface of housing assembly to a top surface of the housing assembly is less than the width of the luminaire and a width of an installation aperture of a recessed installation structure through which the luminaire is to be inserted for mounting the luminaire in the recessed installation structure.

In another aspect, the present disclosure relates to a method that includes providing a luminaire that is configured for recessed installation and comprising a housing assembly that defines an inner cavity that is configured to house a light assembly therein. The light assembly includes a light source and a light transmission unit that are arranged such that light from the light source enters a lightguide panel of the light transmission unit through an edge of the lightguide panel and exits the luminaire through a major surface of the lightguide panel that is substantially perpendicular to the edge. A length of the luminaire that is defined by a long side of the luminaire is greater than a width of the luminaire that is defined by a short side of the luminaire, while a height of the luminaire measured from a bottom surface of a housing assembly of the luminaire to a top surface of a power control device disposed on the housing assembly is less than the width of the luminaire and a width of an installation aperture of a recessed installation structure.

These and other aspects, objects, features, and embodiments, will be apparent from the following description and the appended claims.

BRIEF DESCRIPTION OF THE FIGURES

The foregoing and other features and aspects of the present disclosure are best understood with reference to the following description of certain example embodiments, when read in conjunction with the accompanying drawings, wherein.

Figure 1:
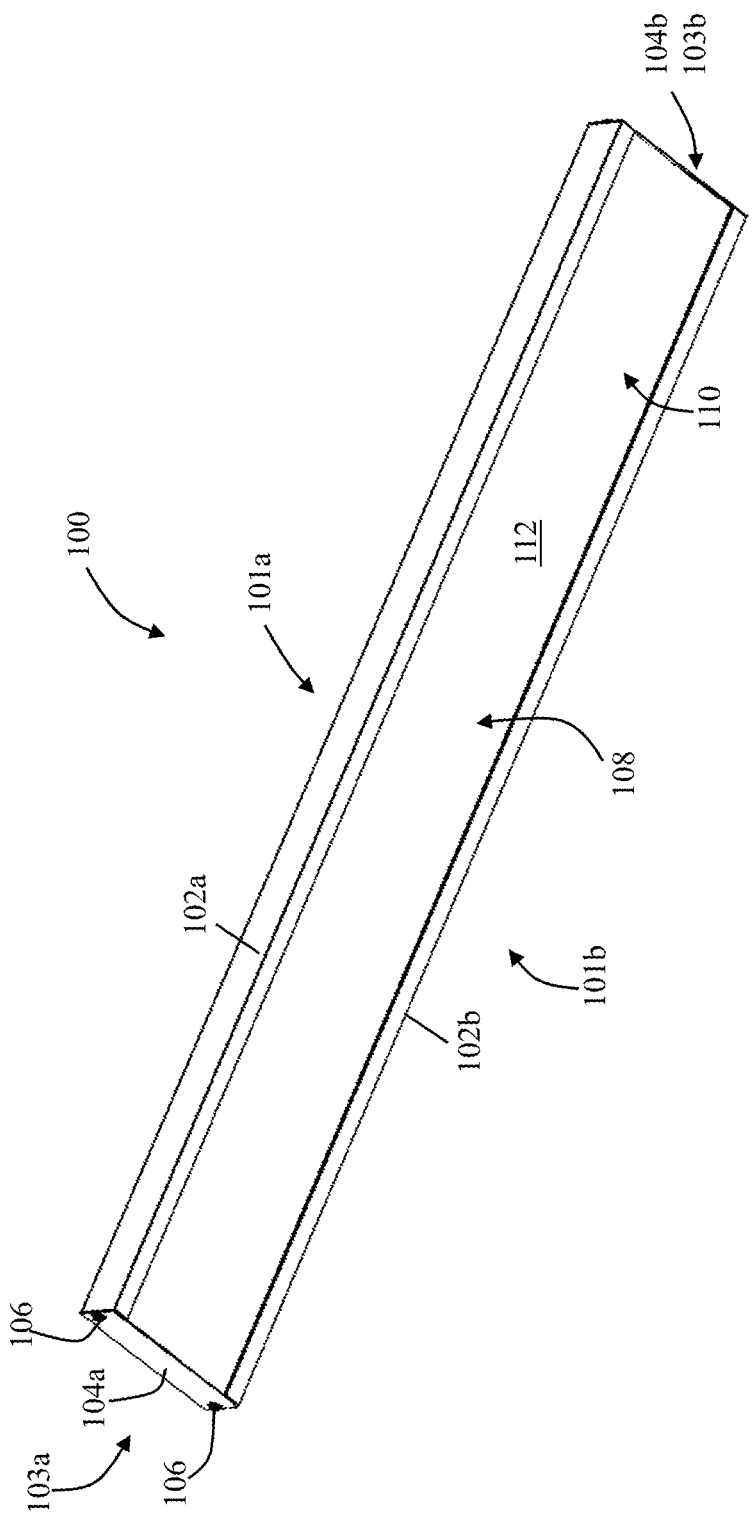
FIG. 1 illustrates a bottom perspective view of an example row mountable modular flat panel luminaire, in accordance with example embodiments of the present disclosure.
Figure 2:
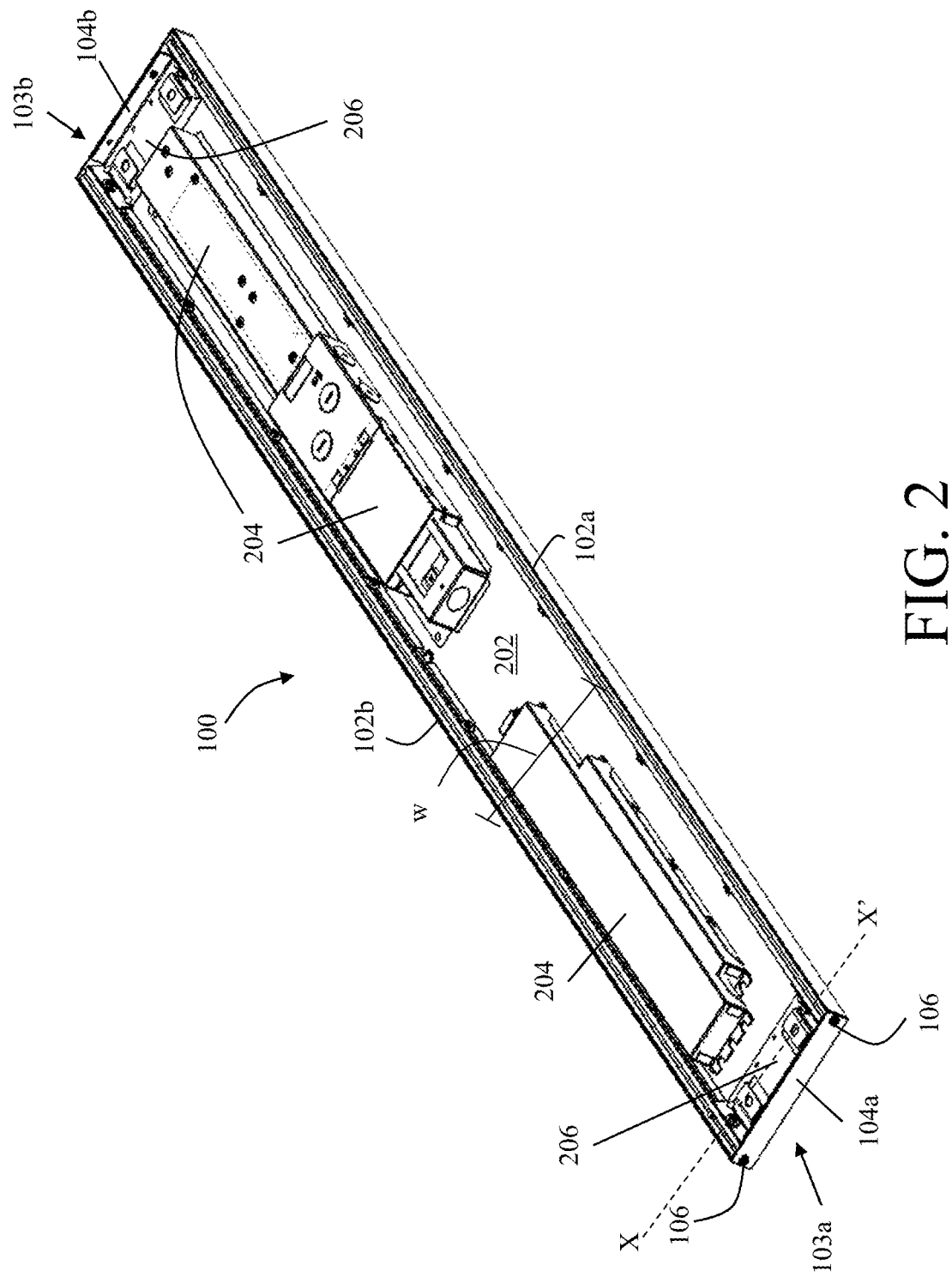
FIG. 2 illustrates a top perspective view of the row mountable modular flat panel luminaire of FIG. 1, in accordance with example embodiments of the present disclosure.

The drawings illustrate only example embodiments of the present disclosure and are therefore not to be considered limiting of its scope, as the present disclosure may admit to other equally effective embodiments. The elements and features shown in the drawings are not necessarily to scale, emphasis instead being placed upon clearly illustrating the principles of the example embodiments. Additionally, certain dimensions or positions may be exaggerated to help visually convey such principles.

DETAILED DESCRIPTION OF EXAMPLE EMBODIMENTS

In the following paragraphs, a recessed flat panel slot luminaire (hereinafter 'flat panel luminaire') will be described in further detail by way of examples with reference to the attached drawings. In the description, well-known components, methods, and/or processing techniques are omitted or are briefly described so as not to obscure the disclosure. As used herein, the "present disclosure" refers to any one of the embodiments of the disclosure described herein and any equivalents. Furthermore, reference to various feature(s) of the "present disclosure" is not to suggest that all embodiments must include the referenced feature(s). The term 'thin luminaire' as used herein may generally refer to a luminaire that has a height (height of luminaire and/or height of luminaire with electronic components such as drivers mounted thereto) that is less than the width and less than the length of the luminaire.

The recessed flat panel slot luminaire (hereinafter 'recessed slot luminaire') of the present disclosure is designed as an edge-lit lightguide based luminaire where light is emitted from the luminaire through a major surface of a lightguide panel of the luminaire that is "edge lit" by a light source from one or more edge surfaces of the lightguide panel which are substantially perpendicular to the major surface of the lightguide panel. Further, the recessed slot luminaire of the present disclosure is designed such that the length of the recessed slot luminaire along its long side is greater than the width of the recessed slot luminaire along its short side, while the height of the recessed slot luminaire is less than the width of the recessed slot luminaire as well as a width of an aperture of a recessed installation structure, such as a T-grid frame or a drywall frame, through which the recessed slot luminaire is to be installed. The term 'height of the flat panel luminaire' as used herein refers to a combined height of the recessed slot luminaire and a driver or other electronic components that are disposed on and coupled to the back plate of the recessed slot luminaire. The recessed slot luminaire of the present disclosure is configured for recessed installation, i.e., the recessed slot luminaire may be certified by code for recessed installation. The flat panel luminaire may include grid clips that are disposed on the back plate of the recessed slot luminaire to securely install the flat panel luminaire in the T-grid frame. The grid clips are configured to be hooked onto the members of the T-grid frame to prevent the recessed slot luminaire from falling through the aperture of the T-grid frame in the event of an earthquake or for fire fighter safety. Additionally, the recessed slot luminaire may have different aspect ratios. For example, the length and width of the different recessed slot luminaire may include, but are not limited to, 4 feet*6 inches, or 2 feet*6 inches, or 4 feet*4 inches, 2 feet*4 inches, etc.

Moving now to discuss the figures, FIGS. 22-32 illustrate a recessed slot luminaire while FIGS. 1-21 illustrate a modular luminaire that is row mountable. In particular, first, FIGS. 22-28 will be described in association with the example embodiments of the recessed slot luminaire; and FIGS. 29-32 will be described in association with an example method of installation of the recessed slot luminaire in a T-grid frame by making example reference back to FIGS. 22-28 as needed. Then, FIGS. 1-21 will be described in association with example embodiments of the modular luminaire that is row mountable.

(a) Recessed Slot Luminaire

Figure 26:
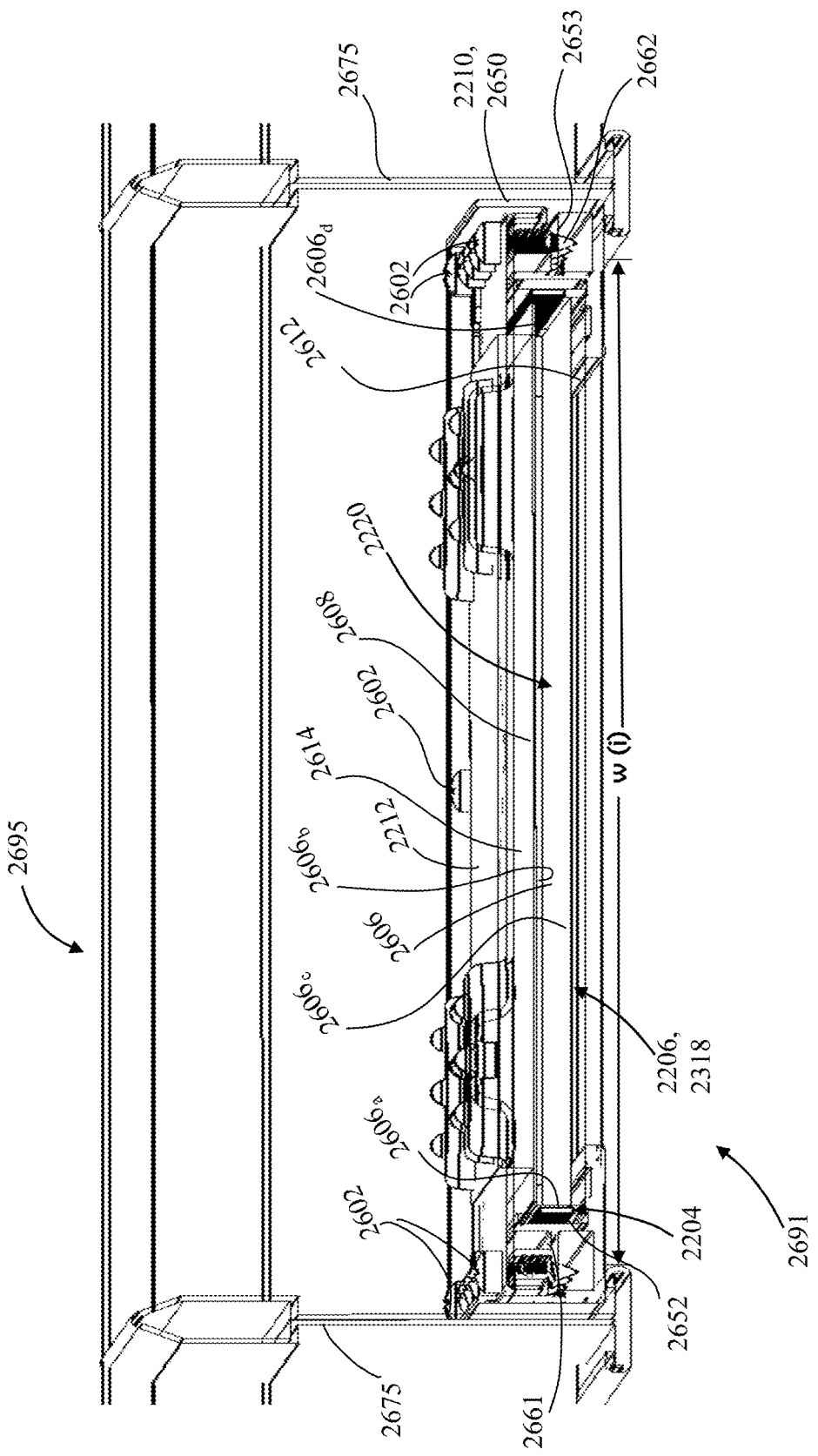
FIG. 26 illustrates a cross-section view of the example recessed flat panel slot luminaire installed in the T-grid frame, in accordance with example embodiments of the present disclosure.
Figure 27:
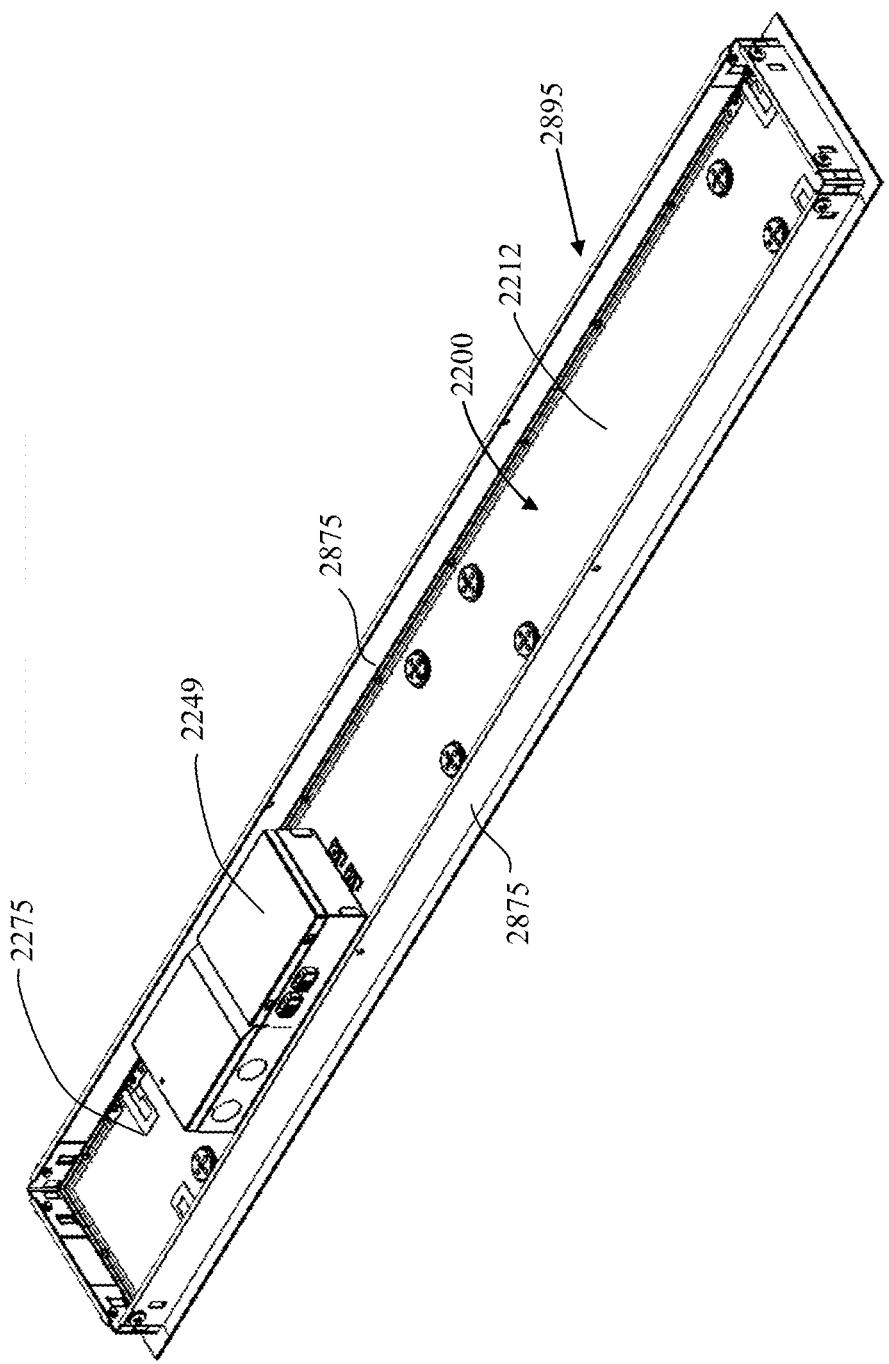
FIG. 27 illustrates a perspective view of the example recessed flat panel slot luminaire installed in a drywall installation frame, in accordance with example embodiments of the present disclosure.

Referring to FIGS. 22-28, the recessed slot luminaire 2200 may include a housing assembly 2202 that defines an internal cavity 2204 (shown in FIG. 26). Further, the recessed slot luminaire 2200 may include a light assembly 2206 (shown in FIG. 26) that is configured to be housed within the internal cavity 2204 defined by the housing assembly 2202.

The housing assembly 2202 may include a front frame 2210 and a back plate 2212 that is coupled to the front frame 2210 using fasteners 2602. The front frame 2210 may include two long members 2214 that are disposed opposite to each other and two short members 2216 that are disposed opposite to each other and between opposite ends of the long members 2214. The long and short members (2214, 2216) of the front frame 2210 may be arranged such that they define a substantially rectangular shaped front frame 2210 with a light emitting opening 2318. The long members 2214 may define a length 'l' of the recessed slot luminaire 2200, while the short members 2216 may define a width 'w' of the recessed slot luminaire 2200.

Figure 28:
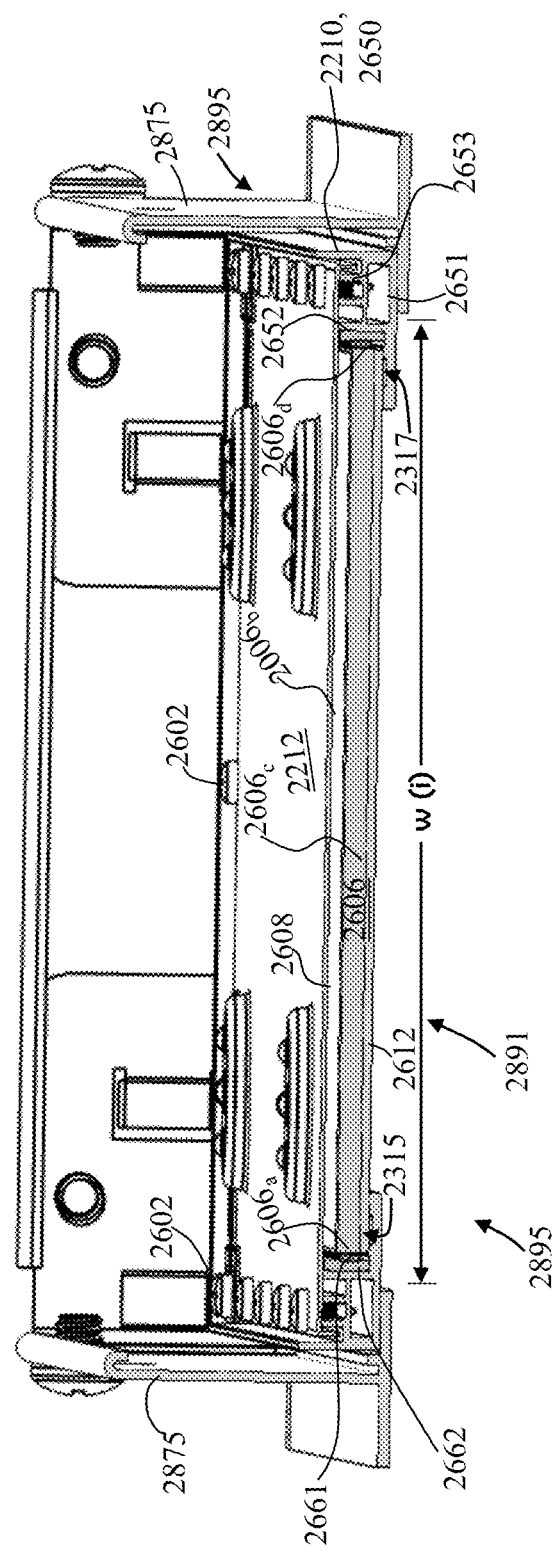
FIG. 28 illustrates a cross-section view of the example recessed flat panel slot luminaire installed in the drywall installation frame, in accordance with example embodiments of the present disclosure.

As illustrated in FIGS. 26 and 28, each long member 2214 (and/or short member 2216) may include a side wall 2650 and a support wall 2651 that extends substantially perpendicular to the side wall 2650 from an edge of the side wall 2650 such that they define a substantially L-shaped cross-sectional profile. Further, each long member 2214 may include a divider flange 2652 that is disposed on the support wall 2651 and is positioned in between an outer edge of the support wall 2651 and the side wall 2650. The divider flange 2652 may extend substantially perpendicular to the support wall 2651. Furthermore, each long member 2214 may include a coupling flange 2653 that extends between the side wall 2650 and the divider flange 2652. The coupling flange 2653 may be offset from the support wall 2651 and may include a plurality of coupling holes that are configured to receive fasteners 2602 therethrough to couple the back plate 2212 to the front frame 2210.

Figure 22:
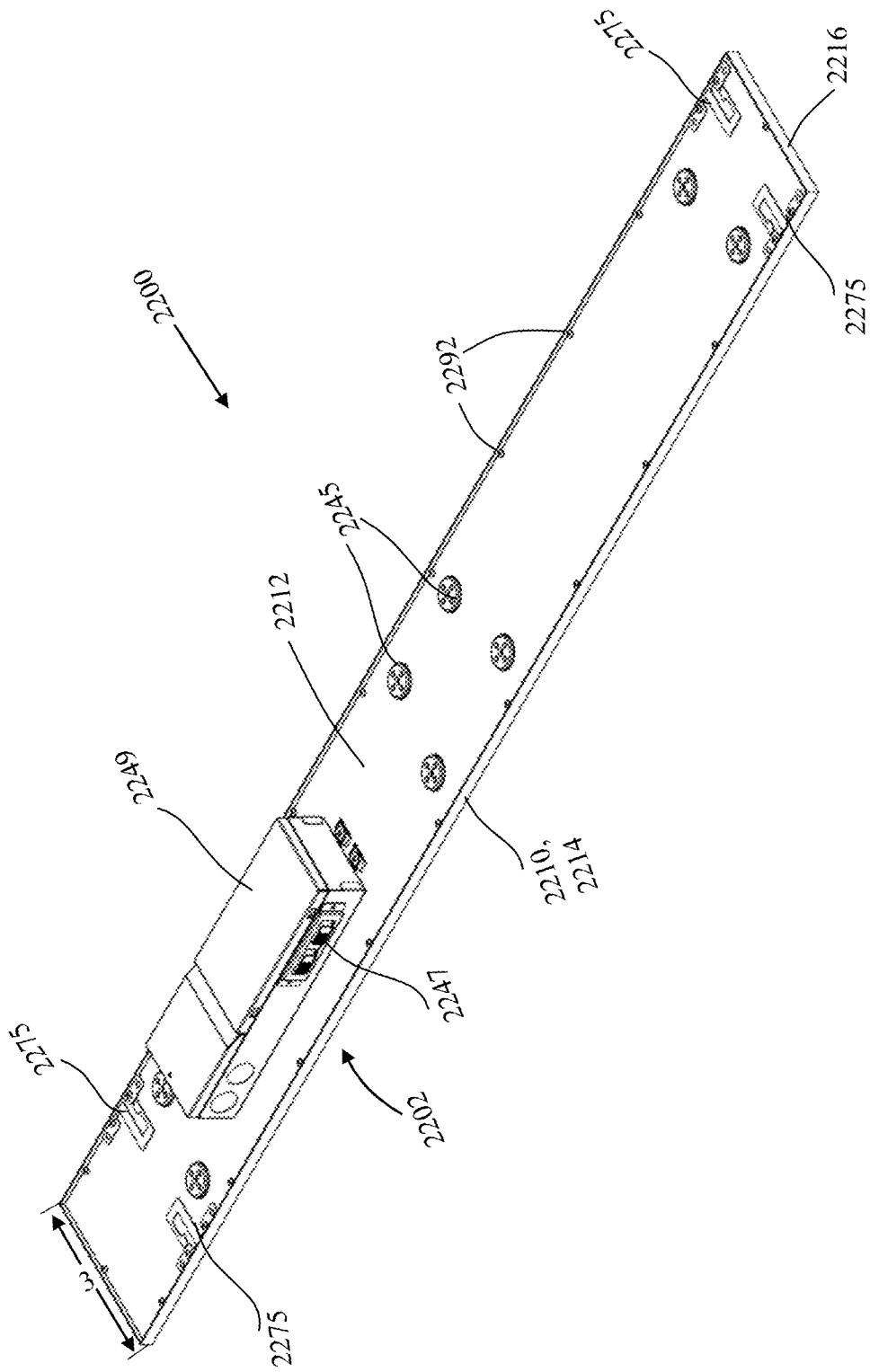
FIGS. 22 and 23 illustrate a top perspective view and a bottom perspective view of an example recessed flat panel slot luminaire, in accordance with example embodiments of the present disclosure.

As illustrated in FIG. 22, the back plate 2212 may include a plurality of coupling holes 2292 and a plurality of mounting features 2245. The plurality of mounting features 2245 of the back plate 2212 may be configured to mount one or more electronic devices, such as drivers 2249, ballasts, emergency battery packs, etc., thereto and thereby couple the one or more electronic devices to the recessed slot luminaire 2200. The driver 2249 may include a user interface feature 2247, such as a switch or buttons, that a user can operate to switch between or control a mode of operation of the recessed slot luminaire 2200. For example, the driver 2249 may be configured to individually control the light sources (e.g., light emitting diodes) of the recessed slot luminaire 2200 to produce a desired light output (e.g., a particular correlated color temperature or intensity of the light output). That is, the switch on the driver 2249 may be configured to control lumen and/or color of light output by the luminaire. The user interface feature 2247 can also be used to control communications with the recessed slot luminaire such as selecting a wireless communication protocol for a wireless transceiver coupled to the luminaire.

In particular, the back plate 2212 may be positioned above the front frame 2210 such that the plurality of coupling holes 2292 of the back plate 2212 are axially aligned with the plurality of coupling holes on the coupling flange 2653 of the front frame 2210. Then, as illustrated in FIGS. 26 and 28, fasteners 2602 (e.g., screws, rivets, etc.) may be passed through the axially aligned coupling holes 2292 of the back plate 2212 and the front frame 2210 to couple the back plate 2212 to the front frame 2210 and thereby define the housing assembly 2202 and the internal cavity 2204 therein.

The recessed slot luminaire 2200 may be certified by code for recessed installation, and the back plate 2212 of the recessed slot luminaire 2200 may include grid clips 2275 that are disposed thereon to securely retain the recessed slot luminaire 2200 within a mounting surface (e.g., ceiling) or a recessed installation structure, such as a T-grid frame 2695 or drywall frame 2895 that is configured to recess mount the recessed slot luminaire 2200 in the mounting surface. The grid clips 2275 are configured to be hooked onto the members 2675 of the T-grid frame 2695 or the walls 2875 of the drywall frame 2895 to prevent the recessed slot luminaire 2200 from falling through an installation aperture (2691, 2891) of a recessed installation structure (2695, 2895) in the event of an earthquake or for fire fighter safety.

The light assembly 2206 that is configured to be disposed in the internal cavity 2204 of the housing assembly 2202 may include a light transmission unit 2220. The light transmission unit 2220 may include a lightguide panel 2606, a diffuser lens 2612, and a reflector 2608 that are stacked together. In particular, the lightguide panel 2606 may be disposed between the reflector 2608 and the diffuser lens 2612 as illustrated in FIGS. 26 and 28. Further, in some example embodiments, a foam panel 2614 may be disposed between the reflector 2608 and the back plate 2212. In other example embodiments, the foam panel 2614 may be omitted without departing from a broader scope of the present disclosure.

The lightguide panel 2606 of the light transmission unit 2220 may include a first major surface 2606b and a second major surface 2606c that is opposite to the first major surface 2606b. Further, the lightguide panel 2606 may include and may be bound by two long edges 2606a and 2606d that are opposite to each other; and two short edges 2606e and 2606f that are opposite to each other. The long and short edges (2606a, 2606d, 2606e, and 2606f) are disposed between the two major surfaces (2606b, 2606c). In one example embodiment, the major surfaces (2606b, 2606c) of the lightguide panel 2606 may be patterned with microlenses that promote controlled release of light internally incident on those major surfaces (2606b, 2606c). The resulting light can provide beneficial illumination for an area that may be occupied by one or more people, for example. In other example embodiments, only one of the major surfaces (2606b or 2606c) may be patterned with microlenses. The microlenses can comprise conical features, truncated cones, convex shapes, or other appropriate features, for example.

Figure 23:
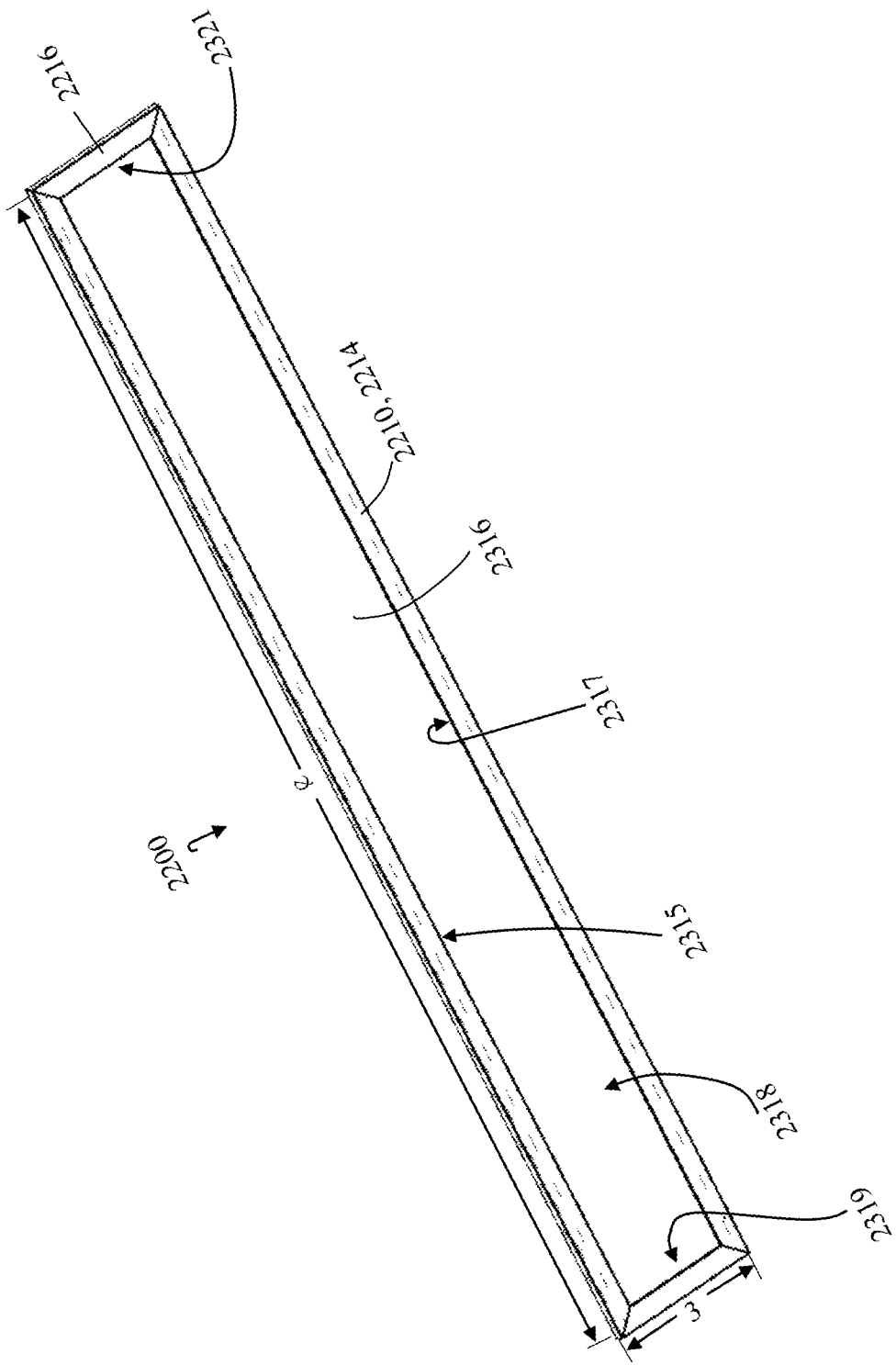

In particular, as illustrated in FIGS. 23, 26, and 28, the longitudinal edges (2315, 2317) and the lateral edges (2319, 2321) of the light transmission unit 2220 may be supported by the support walls 2651 of the long members 2214 and the short members 2216 of the front frame 2210 such that the light transmission unit 2220: (i) is disposed in the internal cavity 2204 defined by the housing assembly 2202, and (ii) covers the light emitting opening 2318, and (iii) long and short members (2214, 2216) form a complete border around the light transmission unit 2220 of the recessed slot luminaire 2200.

Further, the light assembly 2206 may include a light sources 2661 that are disposed on a circuit board 2662 which is attached to a surface of the divider flanges 2652 that faces away from the side walls 2650 of the long members 2214. The light source 2661 may be coupled to the long members 2214 of the front frame 2210 such that: (i) the light sources 2661 are adjacent to and face the long edges 2606*a* and 2606*d* of the lightguide panel 2606, and (ii) the light emitted by the light sources 2661 enters the lightguide panel 2606 through the long edges 2606*a* and 2606*d* of the lightguide panel 2606. Even though FIGS. 26 and 28 illustrate light sources 2661 being coupled to both the long members 2214 of the front frame 2210 and disposed adjacent both the long edges 2606*a* and 2606*d* of the lightguide panel 2606, one of skill in the art can understand and appreciate that in some example embodiments, a light source 2661 may be coupled to only one long member 2214 of the front frame 2210. Further, in other example embodiments, the light sources 2661 may also be coupled to the short members 2216 of the front frame 2210 such that the light sources 2661 are adjacent to and face the short edges 2606*e* and 2606*f* of the lightguide panel 2606.

The light from a light source 2661 that enters the lightguide panel 2606 through a long edge 2606*a* may be guided towards an opposite long edge 2606*d* by the major surfaces (2606*b*, 2606*c*) of the lightguide panel 2606. The major surfaces (2606*b*, 2606*c*) can provide a controlled release of light flowing through the lightguide panel 2606, to illuminate an area. Light can thus propagate in the lightguide panel 2606 via internal reflection from the two major surfaces (2606*b*, 2606*c*), traveling from the light-source facing long edge (e.g., 2606*a*) towards an opposing edge (e.g., 2606*d*), and illumination light can escape from the lightguide panel 2606 through the major surfaces (2606*b*, 2606*c*) and/or the opposing edge. In some example, embodiments, the edges of the lightguide panel 2606 other than the edge through which light enters the lightguide panel 2606 may not be patterned or configured for releasing light therefrom.

A portion of the light that exits the lightguide panel 2606 through the second major surface 2606*c* may pass through the diffuser lens 2612 and exit to an area to be illuminated through the light emitting aperture 2318 defined by the front frame 2210. Further, another portion of the light that exits the lightguide panel 2606 through the first major surface 2606*b* may be reflected back towards the lightguide panel 2606 by the reflector 2608. The portion of the light that is reflected back towards the lightguide panel 2606 by the reflector 2608 may pass through the lightguide panel 2606 and exit via the second major surface 2606*c* of the lightguide panel 2606 towards the area to be illuminated via the light emitting aperture 2318.

Figure 24:
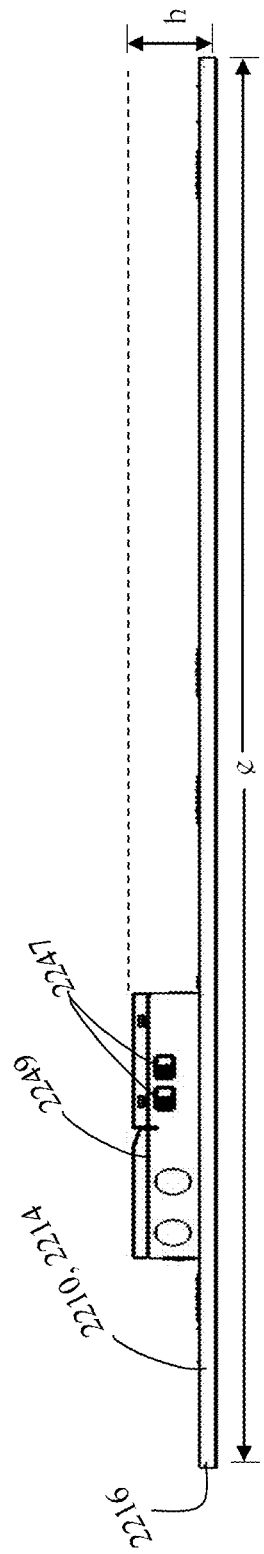
FIG. 24 illustrates a side view of the example recessed flat panel slot luminaire of FIGS. 22 and 23, in accordance with example embodiments of the present disclosure.
Figure 25:
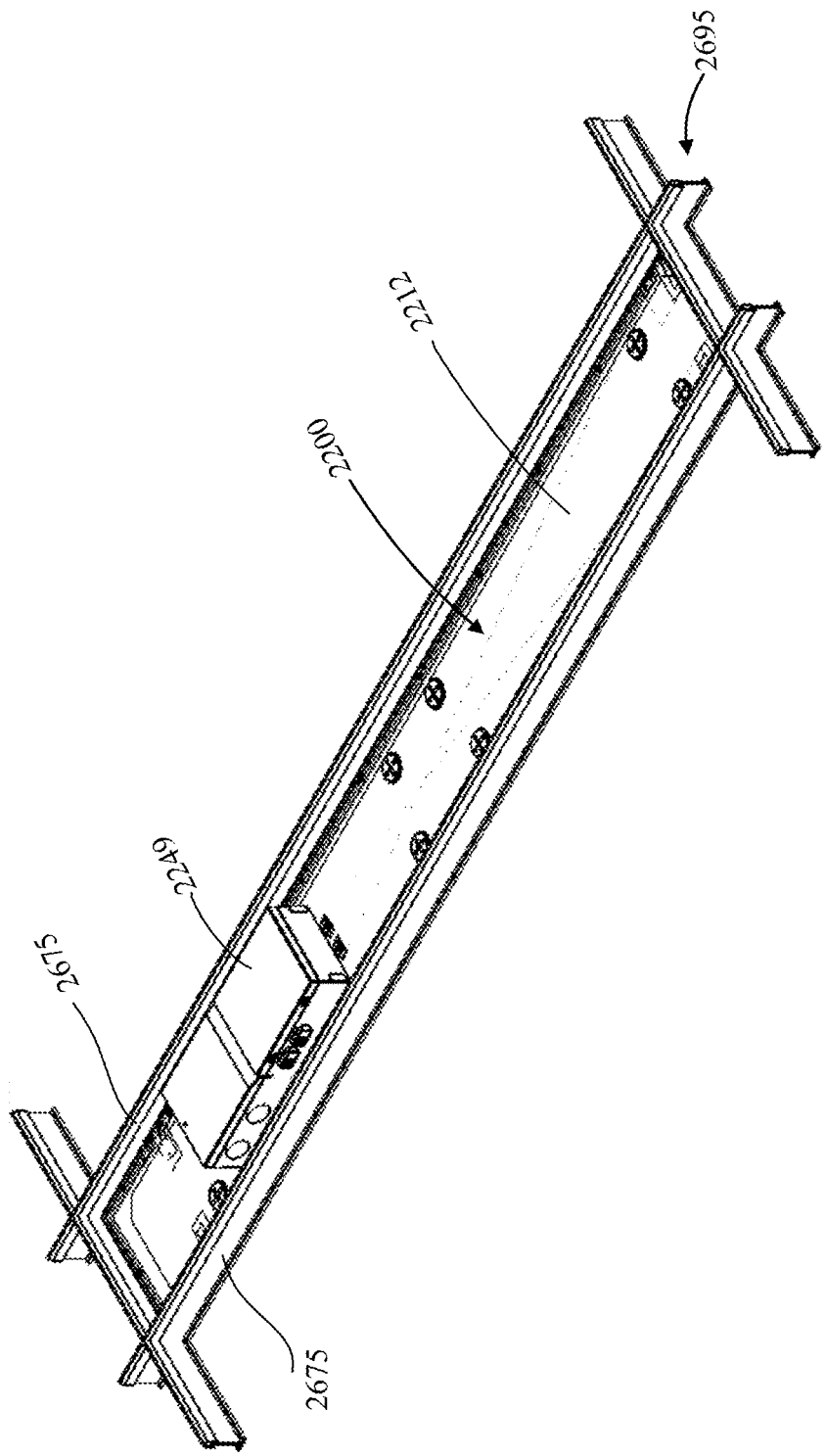
FIG. 25 illustrates a perspective view of the example recessed flat panel slot luminaire installed in a T-grid frame, in accordance with example embodiments of the present disclosure.

As illustrated in FIG. 24, the recessed slot luminaire 2200 including the driver 2249 or any other appropriate electronic components (e.g., ballasts, emergency battery packs, etc.) coupled to the back plate 2212 of the recessed slot luminaire 2200 may have a thickness or height that may be referred to as the total height 'h' of the recessed slot luminaire 2200. That is, the total height 'h' of the recessed slot luminaire 2202 may refer to a distance measured from a bottom of the front frame 2210 to the top of the electronic device (e.g., driver 2249). To allow a recessed installation of the recessed slot luminaire 2200 from underneath (e.g., an area to be illuminated, an area occupied by people, an area below a ceiling (room), etc.) the recessed installation structure, as illustrated in FIGS. 22-24, 26, and 28, the recessed slot luminaire 2200 may be configured such that the total height 'h' of the recessed slot luminaire 2220 is less than the width 'w' of the recessed slot luminaire 2200 that is defined by the short members 2216 of the front frame 2210 and a width 'w(i)' of an installation aperture (2691, 2891) of a recessed installation structure (2695, 2895) through which the recessed slot luminaire 2200 is to be installed. Further, the width 'w' of the recessed slot luminaire 2200 may be less than or equal to the length 'l' of the recessed slot luminaire 2200 that is defined by the long members 2214 of the front frame 2210.

In one example embodiment, the width 'w' of the recessed slot luminaire 2200 may be 4 inches, while in other example embodiment, the width of the recessed slot luminaire 2200 may be 6 inches. In some example embodiments, the width 'w' of the recessed slot luminaire 2200 may be 2 inches. In other words, in one or more example embodiments, the width 'w' of the recessed slot luminaire 2200 of the present disclosure may be less than 1 foot. In said example embodiments, the recessed slot luminaire 2200 can have any appropriate length 'l' as long as the above described dimensional restrictions are maintained, i.e., the width 'w' of the recessed slot luminaire 2200 may be less than or equal to the length 'l' of the recessed slot luminaire 2200. For example, the recessed slot luminaire 2200 may be 2 feet long, 1 foot long, 4 feet long, 6 inches long (the width being less than 6 inches), etc. In other words, the different recessed slot luminaires 2200 may include, but are not limited to, 4 feet by 6 inch luminaires, or 2 feet by 6 inch luminaires, or 4 feet by 4 inch luminaires, 2 feet by 4 inch luminaires, 1 feet by 2 inch luminaires, 6 inch by 6 inch luminaires, etc. In said example embodiments, the total height 'h' of the recessed slot luminaires 2200 (i.e., height of luminaire along with electronic components such as drivers, emergency battery packs, etc.) may range from 2 inches to 3 inches, and preferably from 2 inches to 2.5 inches. In one example, the total height 'h' of the recessed slot luminaire 2200 may be 2.05 inches. In some examples, the total height 'h' of the recessed luminaire 2200 may be less than 2 inches.

Even though the present disclosure describes and illustrates the driver 2249 as being disposed on the back plate 2212 of the recessed slot luminaire 2200, one of skill in the art can understand and appreciate that in other example embodiments, the recessed slot luminaire 2200 may not include the driver 2249 disposed thereon. Instead, in said other example embodiments, the driver 2249 may be disposed on the circuit board 2662 of the light assembly 2206 or may be integrated with the light assembly 2206 and may be disposed in the internal cavity 2204 of the housing assembly 2202. In said other example embodiments, the height of the luminaire may be less than the width 'w' of the luminaire and width 'w(i)' of the installation aperture (2691, 2891) of a recessed installation structure (2695, 2895).

In either case, the driver 2249 that is used with the recessed slot luminaire 2200 may be configured such that a height of the recessed slot luminaire 2200 along with the driver 2249 that is either disposed on top of or inside the recessed slot luminaire 2200 may be less than the width 'w' of the luminaire and width 'w(i)' of the installation aperture (2691, 2891) of a recessed installation structure (2695, 2895).

Typically, the width 'w(i)' of the installation aperture (2691, 2891) of the recessed installation structure (2695,

2895) that is configured for installation of a recessed slot luminaire 2200 that is 4 inches wide may range from 3 inch-3.5 inch, while the width 'w(i)' of the installation aperture (2691, 2891) of the recessed installation structure (2695, 2895) that is configured for installation of a recessed slot luminaire 2200 that is 6 inches wide may range from 5 inch-5.5 inch. Accordingly, the example recessed slot luminaire 2200 of the present disclosure that has a total height 'h' that is less than 3 inches may be installed through the installation aperture (2691, 2891) of the recessed installation structure (2695, 2895) and from underneath (from the area to be illuminated/room side) the recessed installation structure (2695, 2895) as illustrated in FIGS. 29-32.

Figure 29:
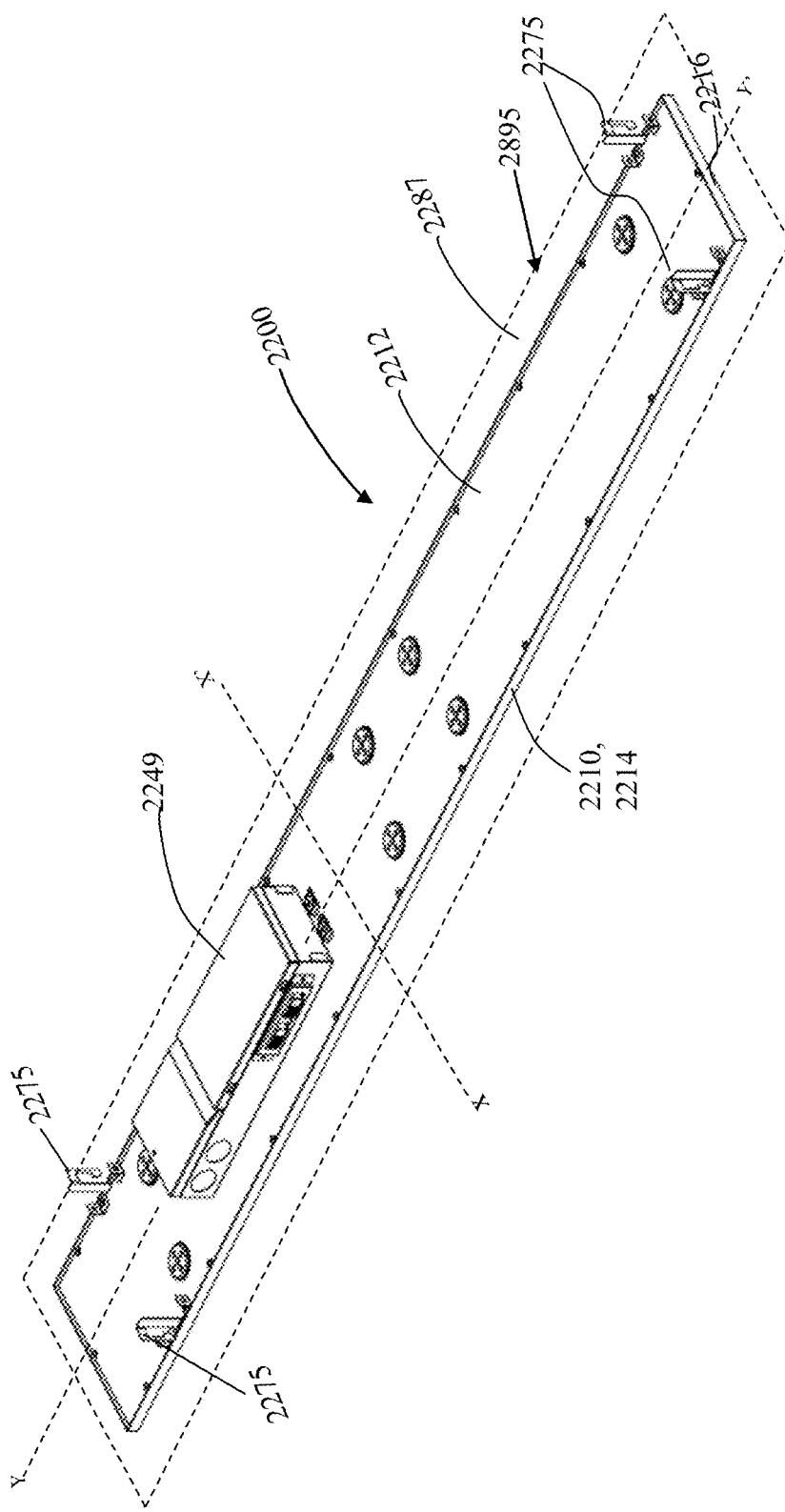
FIGS. 29-32 illustrate a method of installation of the example recessed flat panel slot luminaire installed in a T-grid frame, in accordance with example embodiments of the present disclosure.
Figure 30:
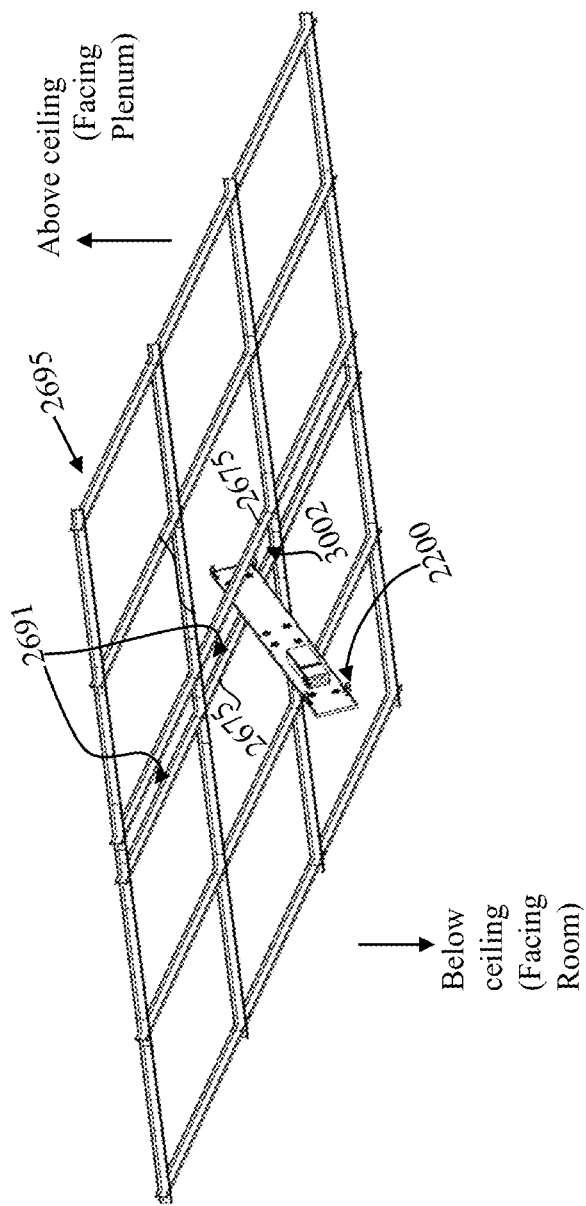
Figure 31:
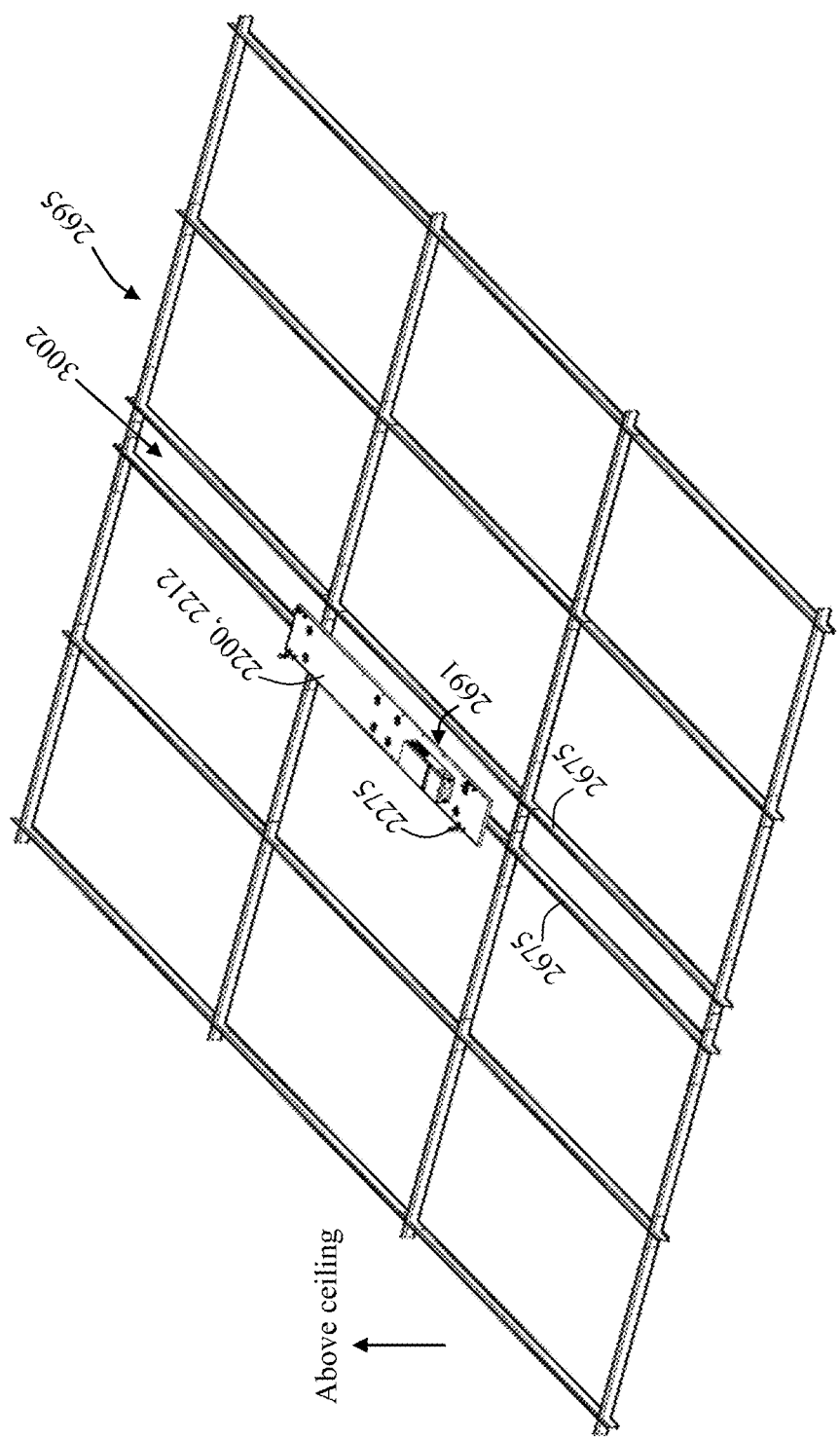
Figure 32:
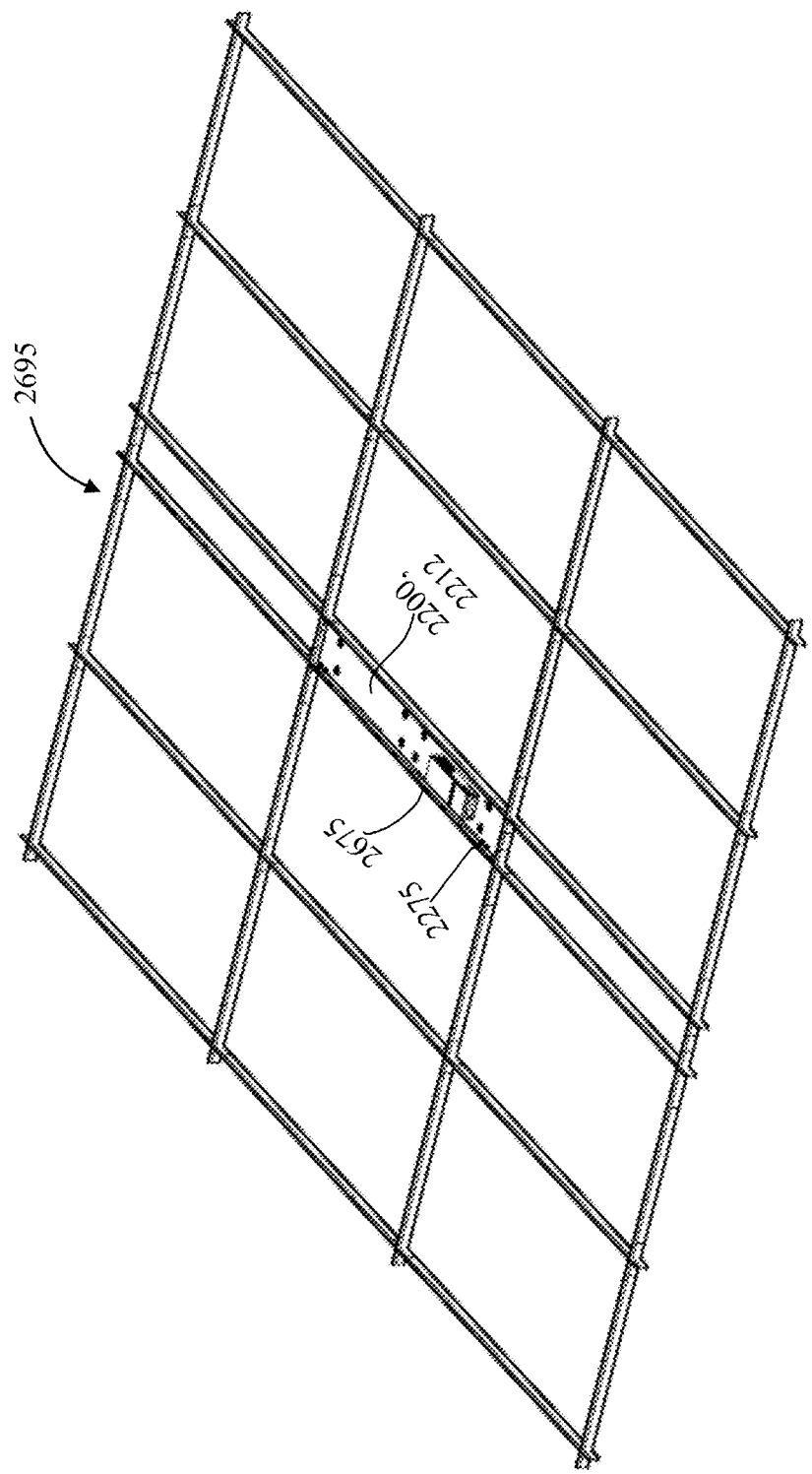

Referring to FIGS. 29-32, an example method of recessed installation of the recessed slot luminaire 2200 in a T-grid frame 2695 will be further described below. The installation of the recessed slot luminaire 2200 may include initially configuring the grid clips 2275 of the recessed slot luminaire 2200 for recessed installation as illustrated in FIG. 29. For example, the grid clips 2275 that are disposed such that they lay flat on the back plate 2212 of the recessed slot luminaire 2220 may be opened to be substantially perpendicular to the back plate 2212. Then, the recessed slot luminaire 2200 may be positioned below the installation aperture 2691 of the T-grid frame 2695 through which the recessed slot luminaire 2200 is to be inserted for installation. Further, the recessed slot luminaire 2200 may be turned on its side, i.e., rotated such that that a plane 2287 (shown in FIG. 29) passing through the long members 2214 of the recessed slot luminaire 2200 may be substantially perpendicular or at a non-zero angle to a plane 3002 defined by the installation aperture 2691. For example, as illustrated in FIG. 30, the recessed slot luminaire 2200 that is positioned below the installation aperture 2691 of the T-grid frame 2679 may be rotated about a longitudinal axis Y-Y' along the length 'l' and/or a lateral axis X-X' along the width 'w' of the recessed slot luminaire such that the plane 2287 passing through the long members 2214 of the recessed slot luminaire 2200 may be substantially perpendicular or at a non-zero angle to a plane 3002 defined by the installation aperture 2691. Then, as illustrated in FIG. 30, the rotated or adjusted recessed slot luminaire 2200 may be inserted through the installation aperture 2691 of the T-grid frame 2695. Once the recessed slot luminaire 2200 is fully inserted through the installation aperture 2691 of the T-grid frame 2695, i.e., the recessed slot luminaire 2200 clears the installation aperture 2691 of the T-grid frame 2695 and is disposed in a space above the T-grid frame 2695 or as the recessed slot luminaire 2200 is being inserted through the installation aperture 2691, the recessed slot luminaire 2200 may be rotated such that the plane 2287 passing through the long members 2214 of the recessed slot luminaire 2200 may be substantially parallel to the plane 3002 defined by the installation aperture 2691, as illustrated in FIG. 31. Then, as illustrated in FIGS. 26 and 32, the recessed slot luminaire 2200 may be brought down from above the T-grid frame 2695 till: (i) the support walls 2651 of the long and short members (2214, 2216) of the recessed slot luminaire's front frame 2210 engage the support flanges 2699 of the T-grid frame 2695, (ii) the grid clips 2275 engage/hook onto the members 2675 of the T-grid frame 2695, and (iii) the recessed slot luminaire 2200 rests on the T-grid frame 2695 such that the recessed slot luminaire 2200 covers the installation aperture 2691.

Even though FIGS. 29-32 illustrate installation of the recessed slot luminaire 2200 of the present disclosure in a T-grid frame 2695, one of skill in the art can understand and appreciate that the recessed slot luminaire 2200 may be installed in the drywall frame 2895 in a substantially similar manner without departing from a broader scope of the present disclosure.

(b) Row Mountable Modular Luminaire

The modular luminaire of the present disclosure is designed as an edge-lit lightguide based luminaire where light is emitted from the luminaire through a major surface of a lightguide panel of the luminaire that is "edge lit" by a light source from one or more edge surfaces of the lightguide panel which are substantially perpendicular to the major surface of the lightguide panel. Further, the modular luminaire of the present disclosure is configured for use in both standalone configurations and row mounted configurations. In a standalone configuration, the modular luminaire may have end caps disposed on the lateral ends of the luminaire to form a complete border around a lightguide panel of the luminaire. However, in a row mounting configuration, the end panels from one or more of the lateral ends may be removed and the modular luminaire is physically coupled with other modular luminaires of the same kind to form a seamless continuous row. In either configuration, the modular luminaire may be configured for, but not limited to, recessed, T-grid, suspended, surface mount, flush mount, or mud-in installations. Furthermore, the modular luminaire is configured to accommodate a variety of optical films therein in order to change an optical distribution of the light emitted from the light guide panel of the modular luminaire as desired (e.g. asymmetric distribution, bat wing distribution, narrow beam distribution, etc.).

An example modular luminaire of the present disclosure includes a lightguide panel that is bound by a pair of opposing first edges, a pair of opposing second edges, a first major surface, and a second major surface that is opposite to the first major surface. Further, the modular luminaire includes two side rail assemblies that are disposed opposite to each other. The two side rail assemblies receive and support the pair of opposing first edges of the lightguide panel such that the lightguide panel is disposed and retained in between the two side rail assemblies. Further, the modular luminaire includes a coupling bracket that is configured to secure or hold the two side rail assemblies together. The coupling bracket is coupled to one of the two side rail assemblies on one end and the other side rail assembly on an opposite end. Furthermore, the modular luminaire includes one or more draw latches that are disposed on the coupling bracket and in between the two side rail assemblies. In one example, the coupling bracket may include a hook side or a latch side of a draw latch disposed thereon, while in another example, the joining bracket may include a hook side of one draw latch and a latch side of another draw latch disposed thereon.

At least one of the two side rail assemblies houses a light source therein such that the light source is positioned adjacent to and facing the respective first edge of the lightguide panel. Light from the light source enters the lightguide panel through the first edge and is emitted through the first and/or the second major surfaces of the lightguide panel. Each of the two side rail assemblies further includes an alignment recess that houses an alignment tab therein. The modular luminaire may be coupled to another modular luminaire of the same kind using the alignment tabs and the draw latches of the modular luminaires to form a seamless continuous row of modular luminaires.

Additionally, the two side rail assemblies define an optical film cavity therebetween that is configured to receive an optical film therein and position the optical film below the lightguide panel such that the lightguide panel and the optical film are spaced apart from each other by an air gap. The optical film may be removably coupled to the modular luminaire thereby allowing an optical distribution of the light emitted from the light guide panel of the modular luminaire to be changed by replacing one optical film with another as desired. In a standalone configuration, the optical film can be installed by feeding one end of a roll of the optical film into the optical film cavity through one end of the modular luminaire, pulling it along the entire length of the modular luminaire, until the optical film reaches the opposite end of the modular luminaire. In the continuous row mounted configuration, the optical film is installed by feeding the roll of optical film into the optical film cavity of the first modular luminaire in the continuous row, and then pulling it through the optical film cavities of adjoining modules of the continuous row of modular luminaires. Alternatively, the optical film may be flexible enough to bend and insert into the optical cavity.

In one example, the modular luminaire may be rectilinear in shape, whereas, in other examples, the modular luminaire may have any other appropriate shape without departing from a broader scope of the present disclosure. For example, the modular luminaire may be L-shaped. Further, the modular luminaire may have different aspect ratios. For example, the length and widths of the different modular luminaires may include, but are not limited to, 4 feet*6 inches, or 2 feet*6 inches, or 4 feet*4 inches, 2 feet*4 inches, etc.

Moving now to discuss the figures, FIGS. 1-10 illustrate an example embodiment of the modular luminaire 100 that is row mountable. Referring to FIGS. 1-10, the modular luminaire 100 may include a first side rail assembly 102a and a second side rail assembly 102b. The first and second side rail assemblies (102a, 102b) may be disposed opposite to and spaced apart from each other such that they form a light emitting aperture 108 therebetween. Further, the modular luminaire 100 may include a light transmission assembly 110, where the longitudinal edges (101a, 101b) of the light transmission assembly 110 are supported by the first and second side rail assemblies (102a, 102b) such that the light transmission assembly 110 is disposed in and covers the light emitting aperture 108. Furthermore, the modular luminaire 100 may include end plates 104a and 104b that are disposed at and configured to cover lateral ends 103a and 103b, respectively, of the side rail assemblies (102a, 102b) and the modular luminaire 100. The end plates 104a and 104b may be removably coupled to the first and second side rail assemblies (102a, 102b) using fasteners 106 or any other appropriate coupling mechanism without departing from a broader scope of the present disclosure. As illustrated in FIG. 1, the end plates (104a, 104b) and the first and second side rail assemblies (102a, 102b) form a complete border around the light transmission assembly 110 of the modular luminaire 100.

Figure 6:
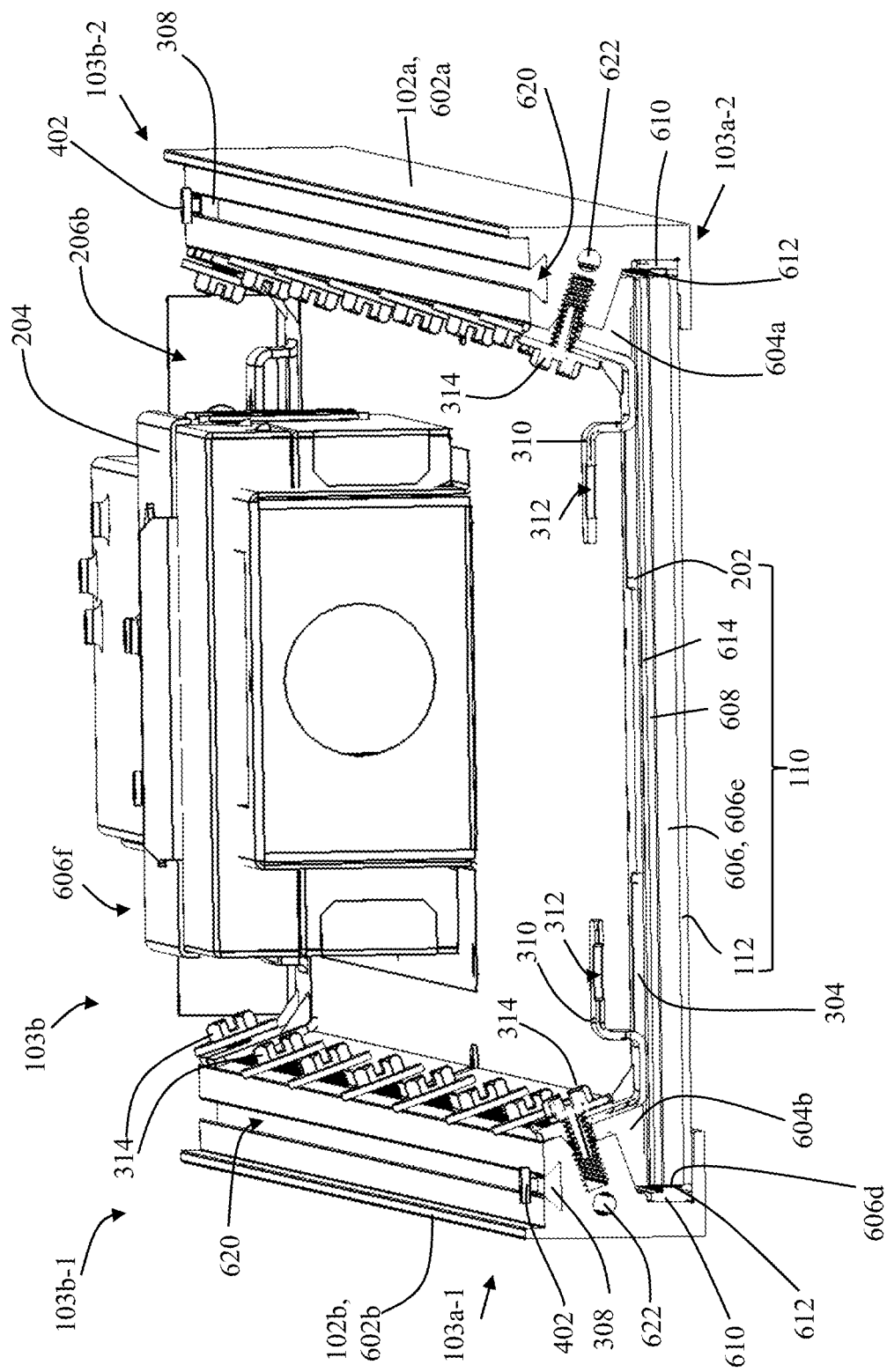
FIG. 6 illustrates a cross-sectional view of the row mountable modular flat panel luminaire of FIG. 1 along an X-X' axis (shown in FIG. 2), in accordance with example embodiments of the present disclosure.
Figure 8:
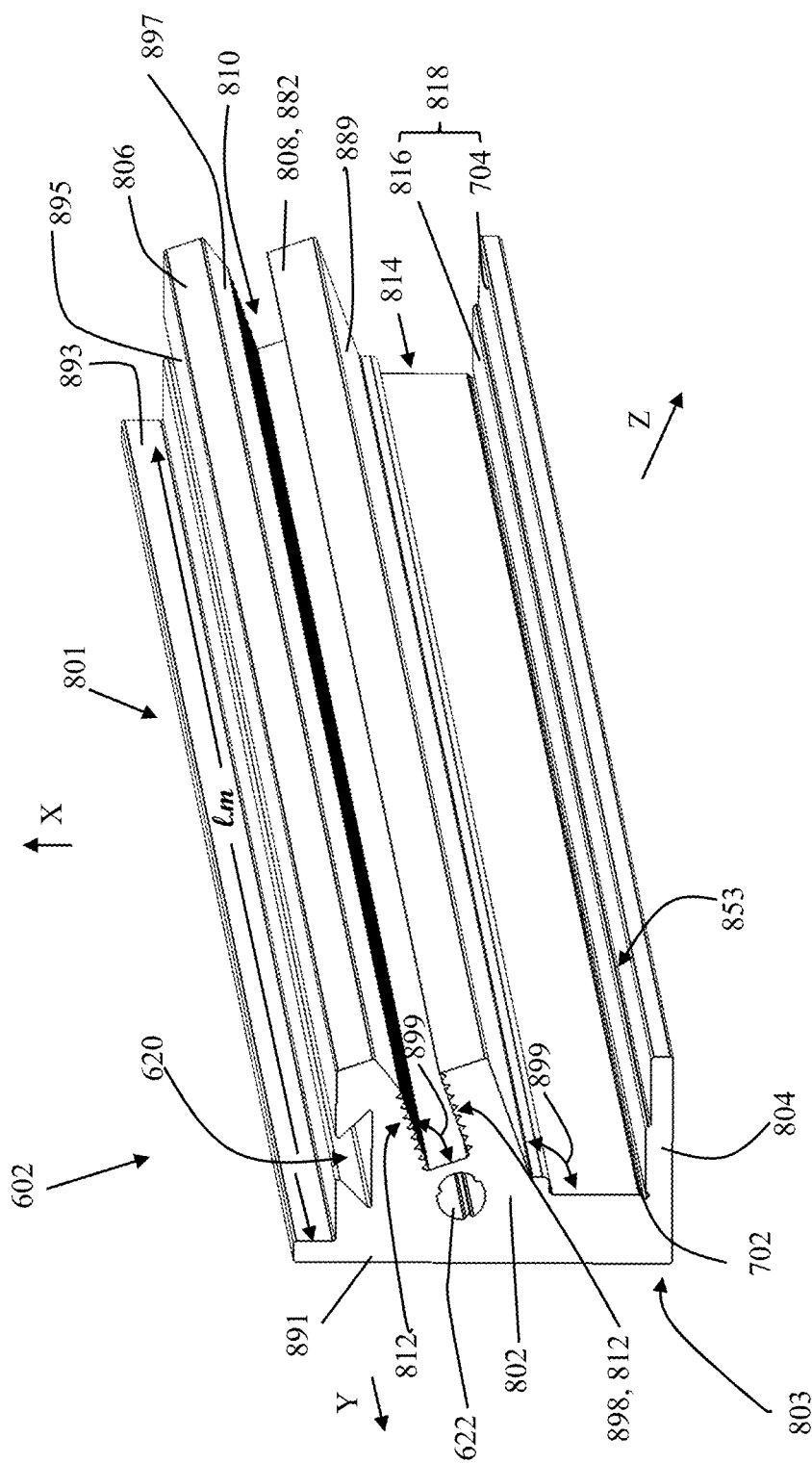
FIG. 8 illustrates a perspective view of a main member of a side rail assembly of the row mountable modular flat panel luminaire of FIG. 1, in accordance with example embodiments of the present disclosure.

As illustrated in FIG. 6, each side rail assembly (102a, 102b) may include a main member 602a, 602b and a compression member 604a, 604b that are coupled together using fasteners 314. Turning to FIG. 8, the main member 602a, 602b may include a side wall 802 that has an outer surface 891 and an inner surface 893 that is disposed opposite to the outer surface 891. Further, the main member 602 may include a support flange 804 that extends out from the inner surface 893 of the side wall 802 in a direction that faces away or opposite to the outer surface 891 of the side wall 802. The support flange 804 may be disposed adjacent a bottom end 803 of the side wall 802 and may be substantially perpendicular to the side wall 802. A top surface 853 of the support flange 804 may define a stepped shoulder 818 that comprises an upper step surface 816 and a lower step surface 704. The support flange 804 of the main member 802 of each side rail assembly (102a, 102b) may be configured to support at least a portion of the light transmission assembly 110 and an optical film thereon such that: (a) the optical film is disposed below the light transmission assembly 110, and (b) the light transmission assembly 110 and the optical film are disposed in between the first and second side rail assemblies (102a, 102b) and cover the light emitting aperture 108 between the first and second side rail assemblies (102a, 102b).

Figure 13:
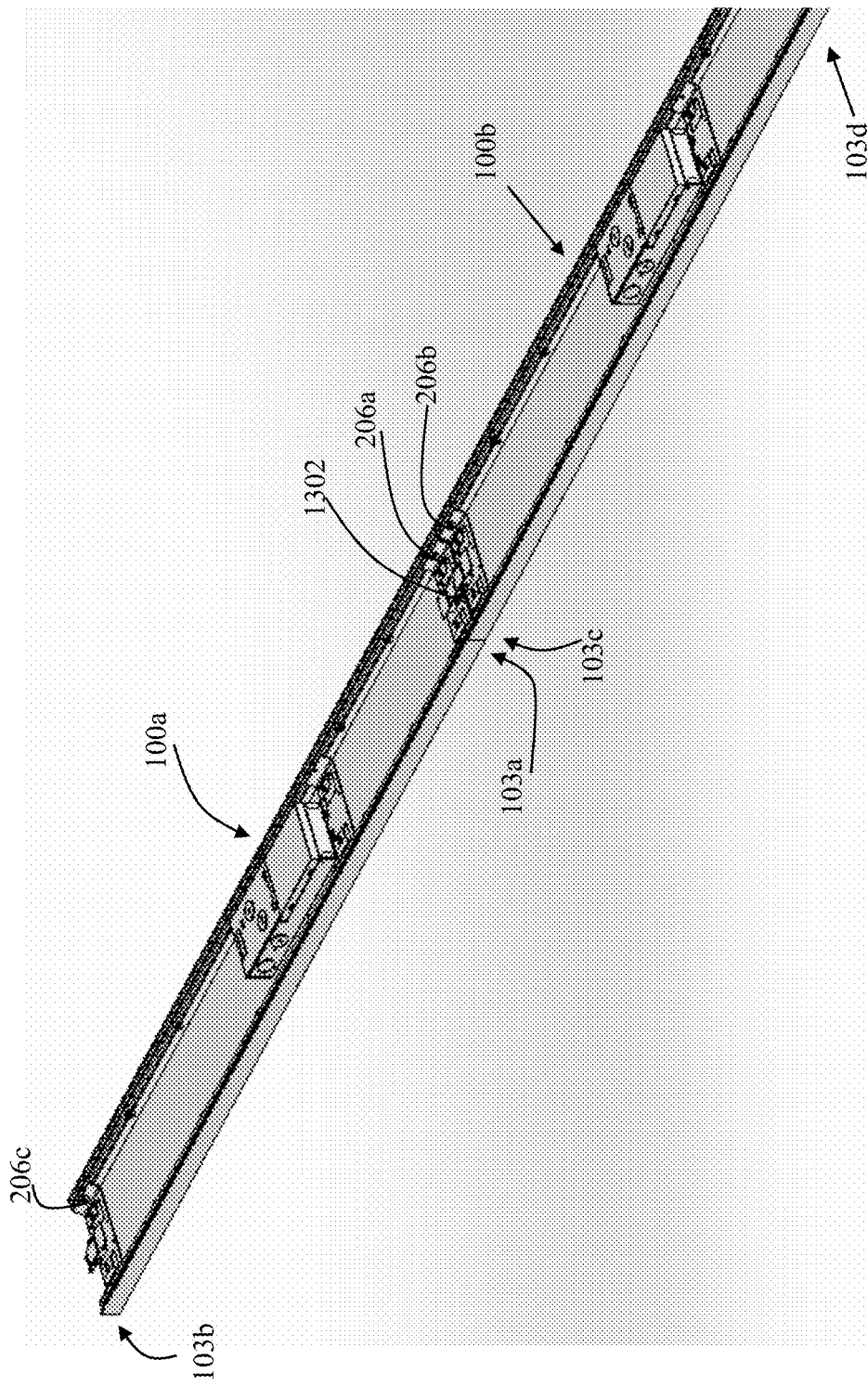
FIGS. 13 and 14 illustrate perspective views of an example row mount assembly comprising two row mountable modular flat panel luminaires that are in a row mounted configuration, in accordance with example embodiments of the present disclosure.
Figure 14:
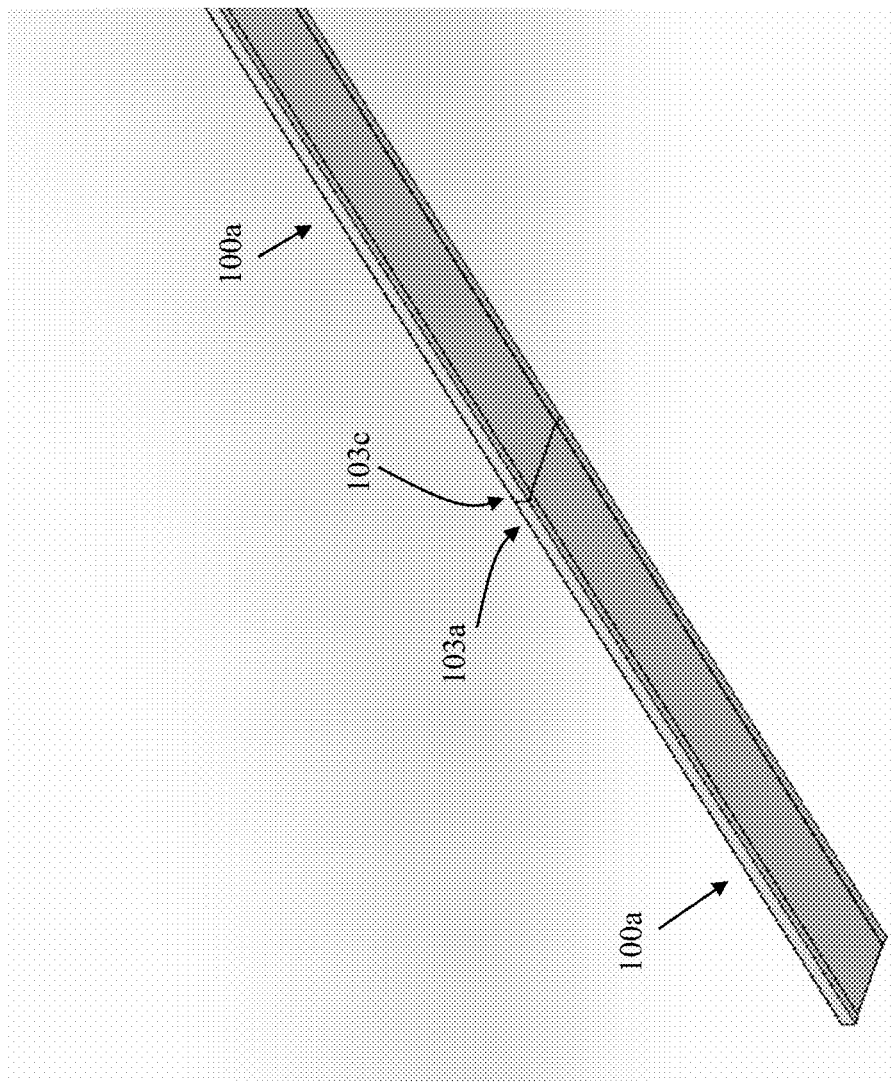
Figure 15:
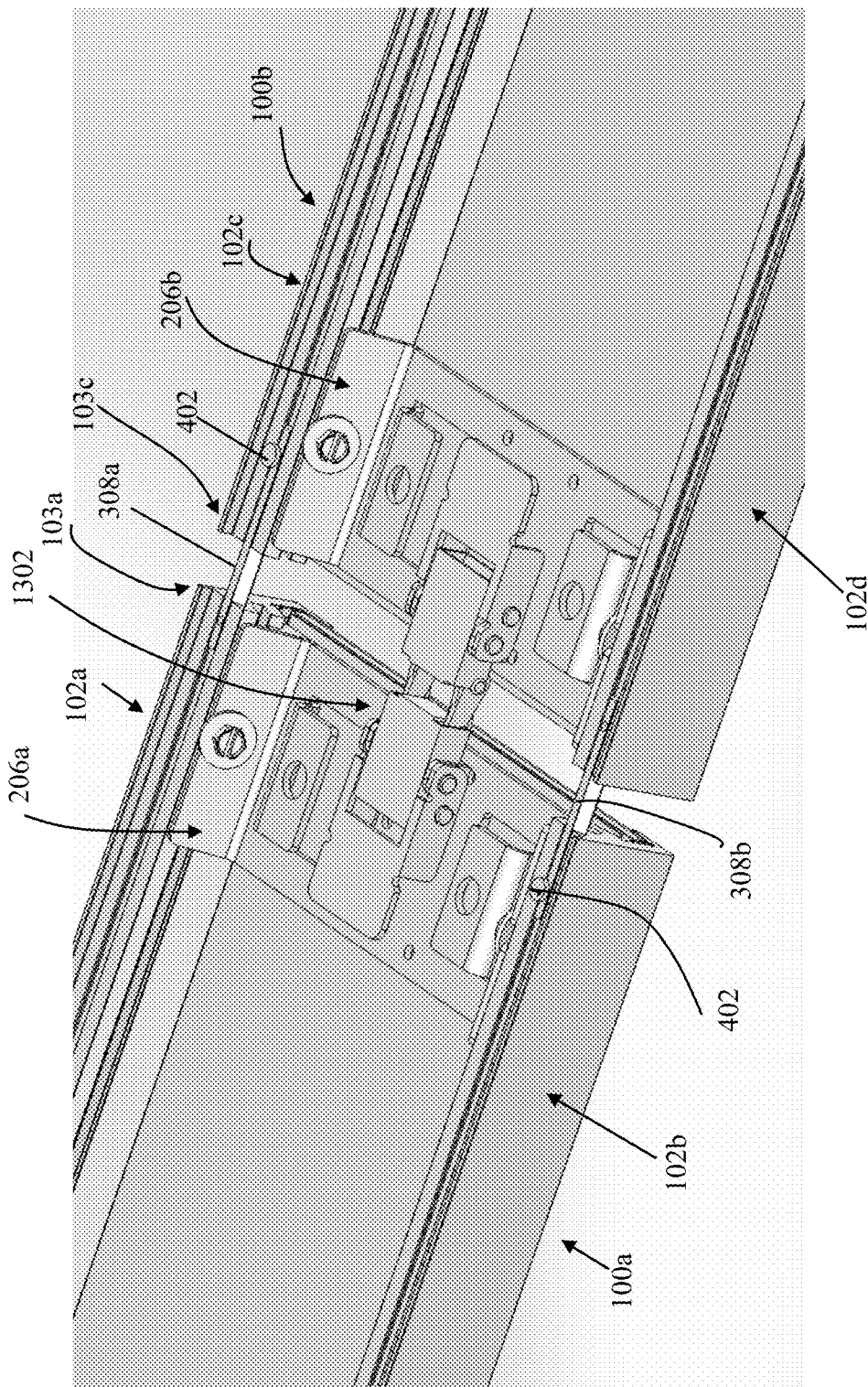
FIG. 15 illustrates an enlarged view of a portion of the row mounted assembly where the two row mounted flat panel luminaires of FIGS. 13 and 14 are coupled but not completely joined, in accordance with example embodiments of the present disclosure.

In addition to the support flange 804, the main member 602 may include a top coupling flange 806 that extends out from the inner surface 893 of the side wall 802 in a direction that faces away or opposite to the outer surface 891 of the side wall 802. The top coupling flange 806 may be offset from the top edge 801 of the side wall 802. In particular, as illustrated in FIG. 8, a top surface 895 of the top coupling flange 806 may be disposed below the top edge 801 of the side wall 802 and may be substantially perpendicular to the side wall 802, while the bottom surface 897 of the top coupling flange 806 may form an obtuse outer angle 899 with the side wall 802. Further, the top coupling flange 806 may comprise an alignment slot 620 formed therein. The alignment slot 620 may be a blind slot that extends from the top surface 895 towards the bottom surface 897 of the top coupling flange 806. The alignment slot 620 may be configured to receive an alignment rod 308 (shown in FIG. 5) therein, where the alignment rod 308 may be used to row mount the modular luminaire 100 with another modular luminaire 100b as shown in FIGS. 13-15.

Figure 5:
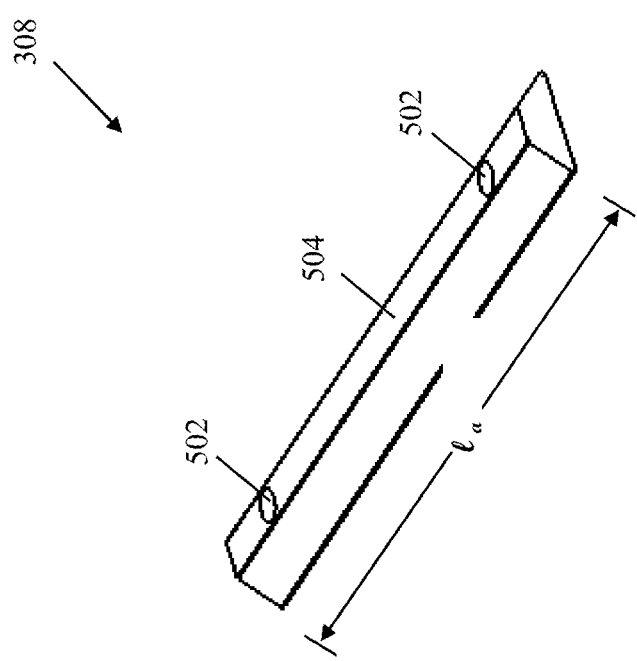
FIG. 5 illustrates a perspective view of an aligner rod of the row mountable modular flat panel luminaire of FIG. 1, in accordance with example embodiments of the present disclosure.

In one example embodiment, the alignment slot 620 may be substantially dovetail shaped, and the corresponding alignment rod 308 that is disposed therein may be substantially dovetail shaped as illustrated in FIG. 5. Even though the present disclosure describes the alignment slot 620 and the alignment rod 308 as being substantially dovetail shaped, one of skill in the art can understand and appreciate that in other example embodiments, the alignment slot 620 and the alignment rod 308 may have any other appropriate shape without departing from a broader scope of the present disclosure. For example, the alignment slot may be a C-shaped profile where the alignment slot extends from the top surface 895 of the top coupling flange 806 through the side wall 802 to the bottom end 803 of the main member 602. In either case, the shape of the alignment rod 308 may substantially match the shape of the alignment slot 620.

As illustrated in FIG. 5, the alignment rod 308 may have coupling holes 502 formed therein. The coupling holes 502 may be blind holes that extend from a top surface 504 towards a bottom surface of the alignment rod 308. In some example embodiments, the coupling holes 502 may be through holes. The coupling holes 502 of the alignment rod 308 may be configured to receive an alignment rod fastener 402 (shown in FIGS. 3 and 4) therein to securely couple and retain the alignment rod 308 in the alignment slot 620 of the main member 602 of each side rail assembly (102a, 102b). Inserting the alignment rod fastener 402 in at least one of the coupling holes 502 and tightening the alignment rod fastener 402 prevents the alignment rod 308 from sliding in and out of the alignment slot 620 in the Y-direction (shown in FIG. 8). Further, the dovetail shape of the alignment rod 308 and the alignment slot 620 along with the alignment rod fastener 402 prevents an undesirable vertical movement of the alignment rod 308 in the X-direction (shown in FIG. 8).

Figure 3:
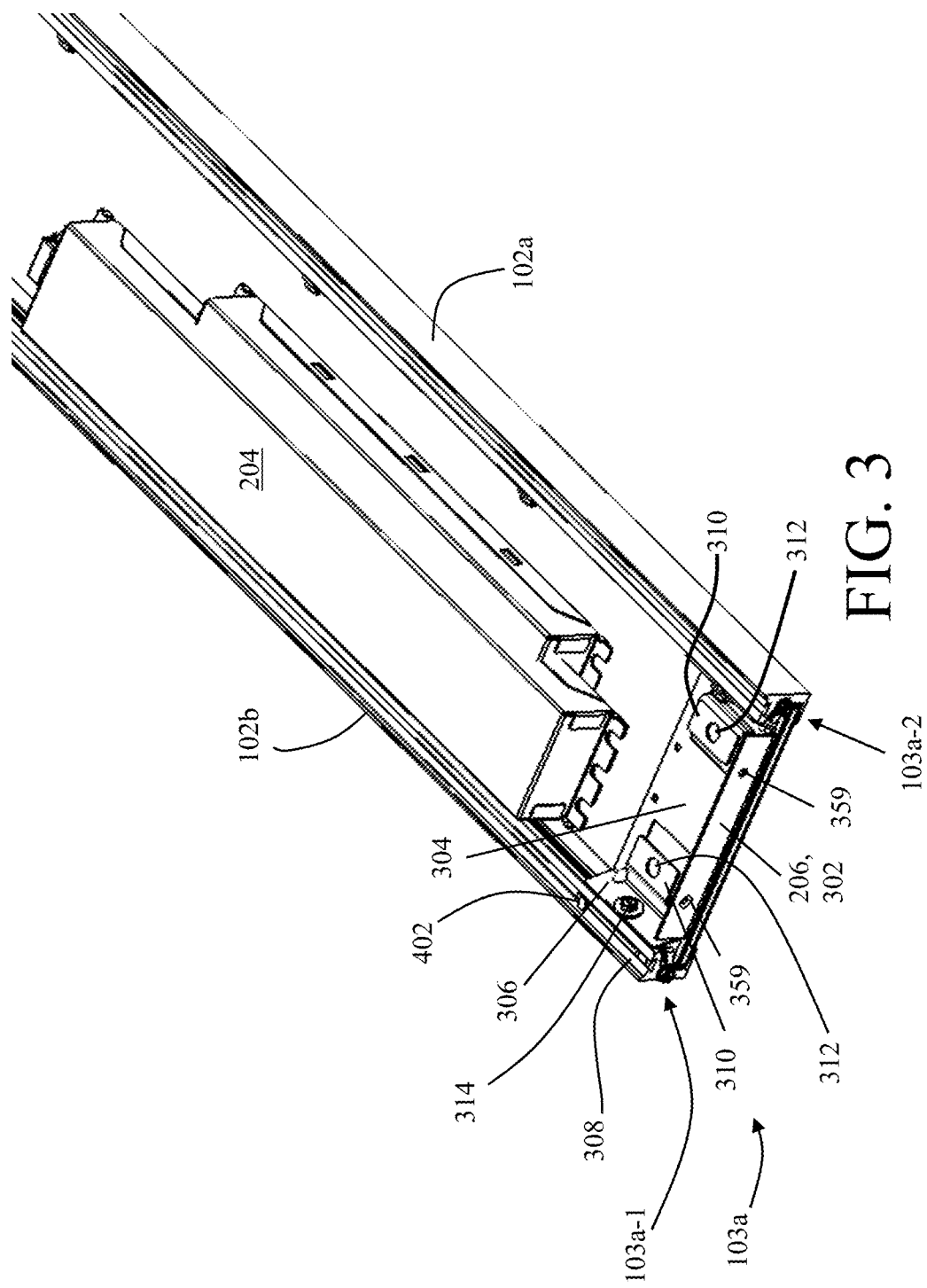
FIG. 3 illustrates an enlarged view of an end portion of the row mountable modular flat panel luminaire of FIG. 1, in accordance with example embodiments of the present disclosure.
Figure 4:
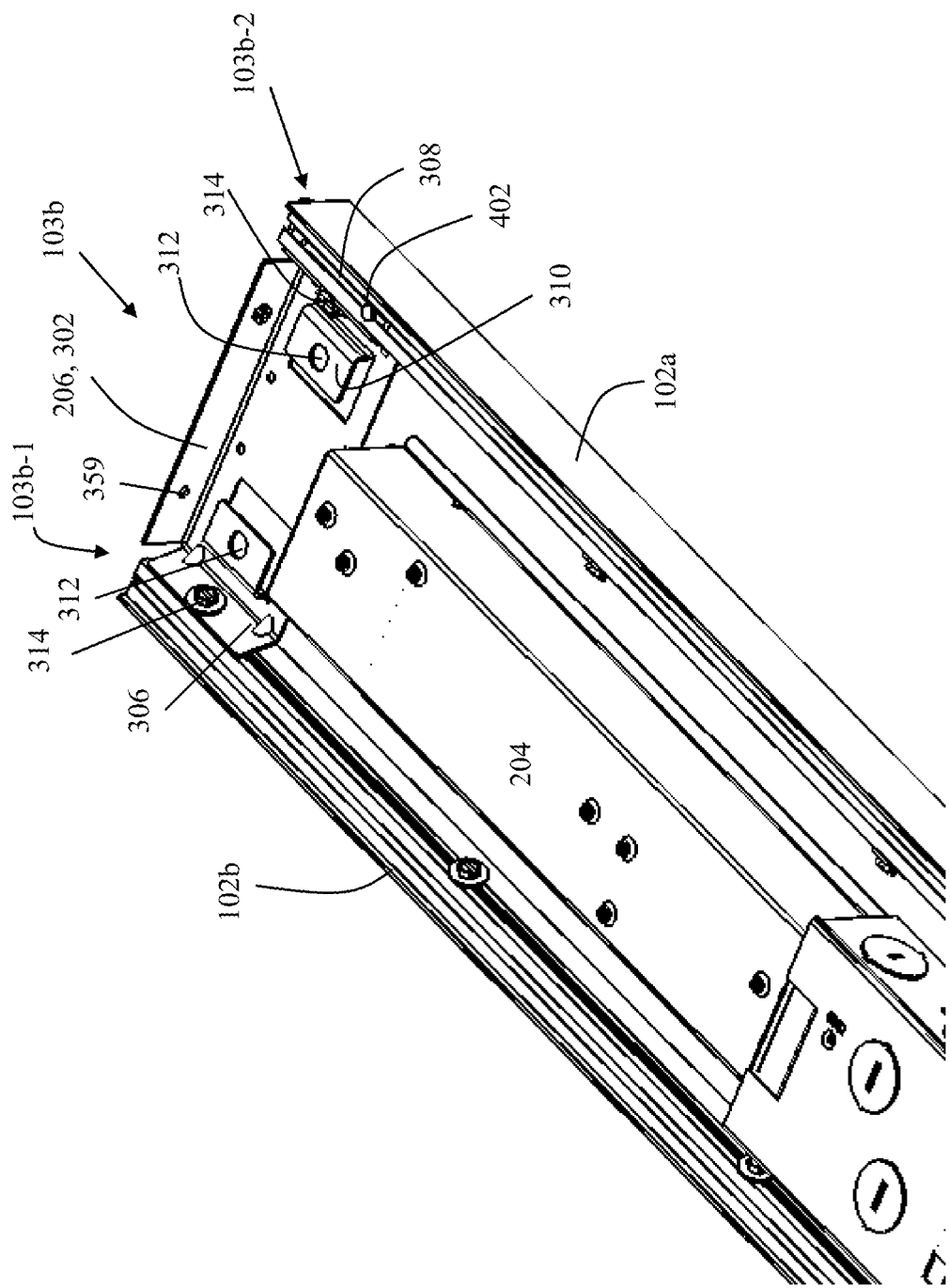
FIG. 4 illustrates an enlarged view of another end portion of the row mountable modular flat panel luminaire of FIG. 1, in accordance with example embodiments of the present disclosure.

As illustrated in FIGS. 3 and 4, the alignment rod 308 may not extend the entire length of the alignment slot 620 and/or main member 602, i.e., from the first lateral end 103a to the second lateral end 103b. In other words, the length 'l_a' of the alignment rod 308 may be less than the length 'l_m' of the main member 602 and/or the alignment slot 620.

Further, as illustrated in FIGS. 3 and 4, in the first side rail assembly 102a, the alignment rod 308 may be disposed in the alignment slot 620 of the main member 602 adjacent a first lateral end 103a of the first side rail assembly 102a; while in the second side rail assembly 102b, the alignment rod 308 may be disposed in the alignment slot 620 of the main member 602 adjacent a second lateral end 103b of the second side rail assembly 102b that is opposite to the first lateral end 103a. In other words, each modular luminaire 100 includes alignment rods 308 disposed at diagonally opposite lateral ends ((103a_1 and 103b_2) or (103a_2 and 103b_1)) of the modular luminaire 100 to allow the modular luminaire 100 to be coupled to another modular luminaire (e.g., 100b (shown in FIG. 13)) on either of the lateral ends (103a, 103b) of the modular luminaire 100 for row mounting. The modular luminaire 100 may be designed with the alignment rods 308 disposed at diagonally opposite lateral ends ((103a_1 and 103b_2) or (103a_2 and 103b_1)) of the modular luminaire 100 so that no matter which way the modular luminaire 100 is turned for coupling there will be an alignment rod. So, a technician does not need to spend additional time trying to match ends of the luminaire. Either end of both the luminaires can be coupled, thereby enabling quick row mounting of the modular luminaire 100 with other similar modular luminaires (e.g., 100b).

Returning to FIG. 8, the main member 602 may further include a bottom coupling flange 808 that extends out and angularly from the inner surface 893 of the side wall such that the bottom coupling flange 808 forms an obtuse outer angle 899 with the side wall 802. The bottom coupling flange 808 may extend in a direction that is facing away or opposite to the outer surface 891. The bottom coupling flange 808 may be substantially parallel to the top coupling flange 806, and the obtuse outer angle 899 formed between the bottom coupling flange 808 and the side wall 802 may be substantially similar to the obtuse outer angle 899 formed between the bottom surface 897 of the top coupling flange 806 and the side wall 802. Further, at least a portion of the bottom surface 897 of the top coupling flange 806 and at least a portion of the top surface 898 of the bottom coupling flange 808 may have threads 812 formed therein. The bottom coupling flange 808 and the top coupling flange 806 may be arranged such that the threaded portion 812 of the bottom surface 897 of the top coupling flange 806 faces the threaded portion 812 of the top surface 898 of the bottom coupling flange 808 to form a threaded screw slot 810 therebetween. Furthermore, the bottom coupling flange 808 and the support flange 804 may define a light assembly cavity 814 therebetween.

Figure 7:
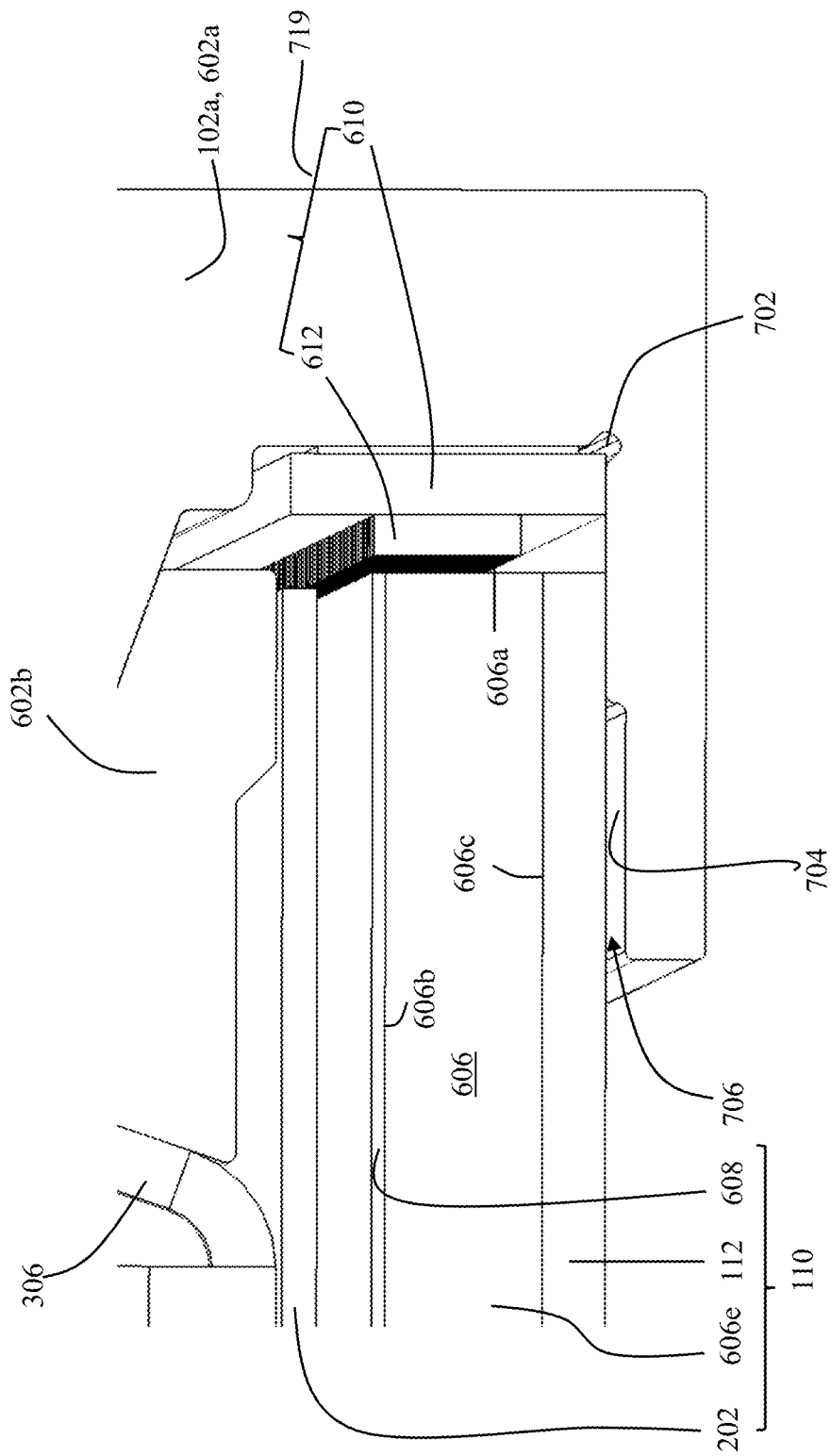
FIG. 7 illustrates an enlarged view of a cross-section of a portion of the row mountable modular flat panel luminaire of FIG. 1 along the X-X' axis, in accordance with example embodiments of the present disclosure.

The light assembly cavity 814 may be configured to receive and retain a light source assembly 719 and at least a portion of the light transmission assembly 110 therein such that a light source 612 of the light source assembly 719 is positioned adjacent an edge 606a of a lightguide panel 606 of the light transmission assembly 110 as illustrated in FIG. 7. As illustrated in FIGS. 6 and 7, the light source assembly 719 may include a substrate 610, such as a print circuit board, and a plurality of light emitting diodes (LEDs) 612 disposed thereon. In other example embodiments, the light source assembly 719 may include any other appropriate light source other than the LEDs without departing from a broader scope of the present disclosure. Further, the light transmission assembly 110 may include a lightguide panel 606, a diffuser lens 112, a reflector 608, a foam panel 614, and a back plate 202 that are stacked together. In particular, the lightguide panel 606 may be disposed between the reflector 608 and the diffuser lens 112 as illustrated in FIG. 7. Further, the back plate 202 may be disposed above the reflector 608 and the foam panel 614 may be disposed between the back plate 202 and the reflector 608. In some example embodiments, the foam panel 614 may be omitted (as illustrated in FIG. 7) without departing from a broader scope of the present disclosure.

The lightguide panel 606 may include a first major surface 606b and a second major surface 606c that is opposite to the first major surface 606b. Further, the lightguide panel 606 may include and may be bound by two long edges 606a and 606d that are opposite to each other; and two short edges 606e and 606f that are opposite to each other. The long and short edges (606a, 606d, 606e, and 606f) are disposed between the two major surfaces (606b, 606c). In one example embodiment, the major surfaces (606b, 606c) of the lightguide panel 606 may be patterned with microlenses that promote controlled release of light internally incident on those major surfaces (606b, 606c). The resulting light can provide beneficial illumination for an area that may be occupied by one or more people, for example. In other example embodiments, only one of the major surfaces (606b or 606c) may be patterned with microlenses. The microlenses can comprise conical features, truncated cones, convex shapes, or other appropriate features, for example.

As illustrated in FIGS. 6 and 7, a long edge of the light transmission assembly 110 rests on the upper step surface 816 of the support flange 804 of the main member 602 associated with the first side rail assembly 102a, while an opposite long edge of the light transmission assembly 110 rests on the upper step surface 816 of the support flange 804 of the main member 602 associated with the second side rail assembly 102b such that: (a) at least a portion of the light transmission assembly comprising the long edges (606a, 606d) of the lightguide panel 606 is disposed in the light assembly cavity 814 of each side rail assembly (102a, 102b), and (b) the light transmission assembly 110 extends between the two side rail assemblies (102a, 102b) such that it covers the light emitting aperture 108.

Further, the substrate 610 of the light source assembly 719 may be attached to an inner surface 893 of the side wall 802 of the main member 602 associated with at least one of the side rail assemblies (102a, 102b) such that the LEDs 612 disposed thereon are adjacent to and face a respective long edge (606a or 606d) of the lightguide panel 606 of the light transmission assembly 110. The main member 602 of each side rail assembly (102a, 102b) may include a relief cut 702 (shown in FIG. 7) formed between the side wall 802 and the support flange 804. The relief cut 702 may be configured to ensure that the bottom edge of the substrate 610 of the light source assembly 719 is flush with the upper step surface 816 of the support flange 804 and the light source 612 of the light source assembly 719 is aligned with the edge (e.g., 606a) of the lightguide panel 606.

Light from the LEDs 612 may enter the lightguide panel 606 via a long edge 606a of the lightguide panel 606 (or 606d if LEDs are disposed in the other side rail assembly 102b) facing the LEDs 612. Further, light from the LEDs 612 that enters the lightguide panel 606 through the long edge 606a may be guided towards the opposite long edge by the major surfaces (606b, 606c) of the lightguide panel 606. The major surfaces (606b, 606c) can provide a controlled release of light flowing through the lightguide panel 606, to illuminate an area. Light can thus propagate in the lightguide panel 606 via internal reflection from the two major surfaces (606b, 606c), traveling from the light-source facing long edge towards an opposing edge, and illumination light can escape from the lightguide panel 606 through the major surfaces (606b, 606c) and/or the opposing edge. In some example, embodiments, the edges of the lightguide panel 606 other than the edge through which light enters the lightguide panel 606 may not be patterned or configured for releasing light therefrom.

A portion of the light that exits the lightguide panel 606 through the second major surface 606c may pass through the diffuser lens 112 and exit to an area to be illuminated through the light emitting aperture 108 formed between the side rail assemblies (102a, 102b). Further, another portion of the light that exits the lightguide panel 606 through the first major surface 606b may be reflected back towards the lightguide panel 606 by the reflector 608. The portion of the light that is reflected back towards the lightguide panel 606 by the reflector 608 may pass through the lightguide panel 606 and exit via the second major surface 606c of the lightguide panel 606 towards the area to be illuminated via the light emitting aperture 108.

In addition to passing through the diffuser lens 112, the light that exits the lightguide panel 606 through the second major surface 606c may pass through an optical film that may be disposed in an optical film cavity 706 (shown in FIG. 7) that is formed between the lower step surface 704 of the support flange 804 of each side rail assembly (102a, 102b) and the diffuser lens 112 of the light transmission assembly 110. The optical film that is disposed in the optical film cavity 706 may be spaced apart from the diffuser lens and may be configured to change an optical distribution of the light exiting the lightguide panel 606 and the modular luminaire 100 to a desired optical distribution, such as, but not limited to, asymmetric distribution, bat wing distribution, narrow beam distribution, etc.

The optical film may be removably coupled to the modular luminaire 100 thereby allowing an optical distribution of the light exiting the lightguide panel 606 and the modular luminaire 100 to be changed by replacing one optical film with another based on a desired optical distribution pattern. In a standalone configuration, the optical film may be installed by feeding a roll of the optical film into the optical film cavity 706 through one of the lateral ends (103a or 103b) of the modular luminaire 100, pulling it through the optical film cavity 706 along the entire length of the modular luminaire 100 (e.g., '1_m'), until reaching the opposite lateral end (103b or 103a) of the modular luminaire 100. However, in an example embodiment where a first modular luminaire 100a is row mounted with a second modular luminaire 100b as illustrated in FIG. 13, the optical film is installed by feeding the roll of optical film into the optical film cavity 706 of the first modular luminaire 100a in the row, and then pulling it along the entire length of the row of both the modular luminaires (100a, 100b), until reaching the opposite lateral end (103b or 103a) of the last modular luminaire (e.g., second modular luminaire 100b) of the row of modular luminaires (100a, 100b).

As illustrated in FIG. 6, the stack of components (202, 614, 608, 606, 112) that form the light transmission assembly 110 may be held together by a compression member 604a, 604b of each side rail assembly (102a, 102b). The compression member applies a compression force to a portion of light transmission assembly 110 disposed in the light assembly cavity 814 of each of the two side rail assemblies (102a, 102b). The compression force provides a compression fit to hold the stack of components (202, 614, 608, 606, 112) that form the light transmission assembly 110 securely within the side rail assemblies (102a, 102b) and prevent an undesirable vertical movement of the components (202, 614, 608, 606, 112) in the X-direction (vertical) and an undesirable movement in the Y-direction (i.e., in-out/normal to page).

Figure 9:
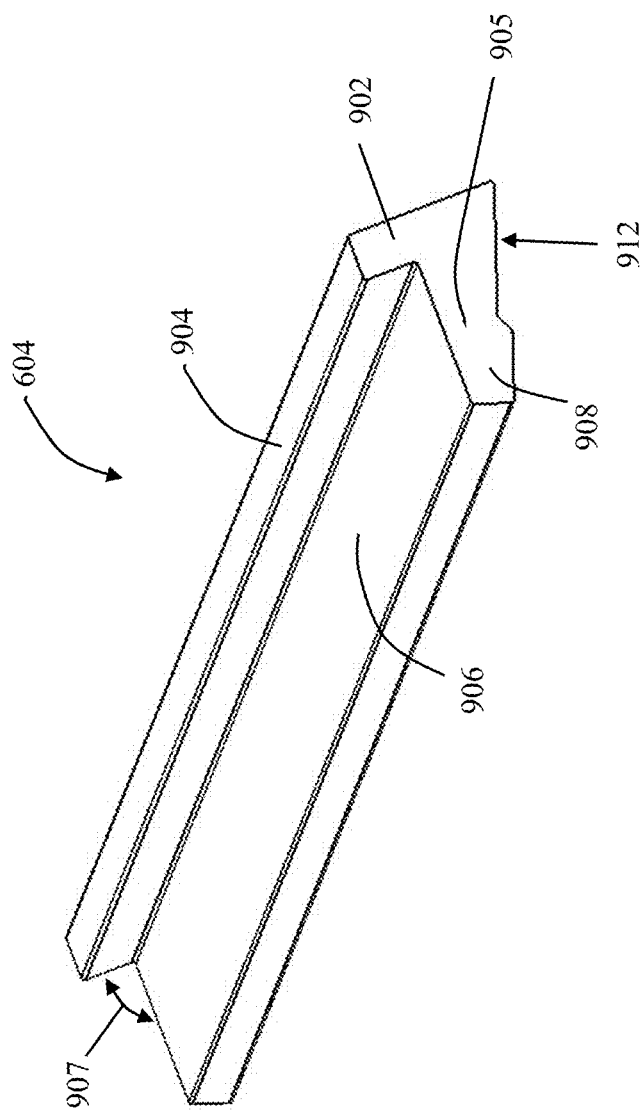
FIGS. 9 and 10 illustrate different perspective views of a compression member of the side rail assembly of the row mountable modular flat panel luminaire of FIG. 1, in accordance with example embodiments of the present disclosure.
Figure 10:
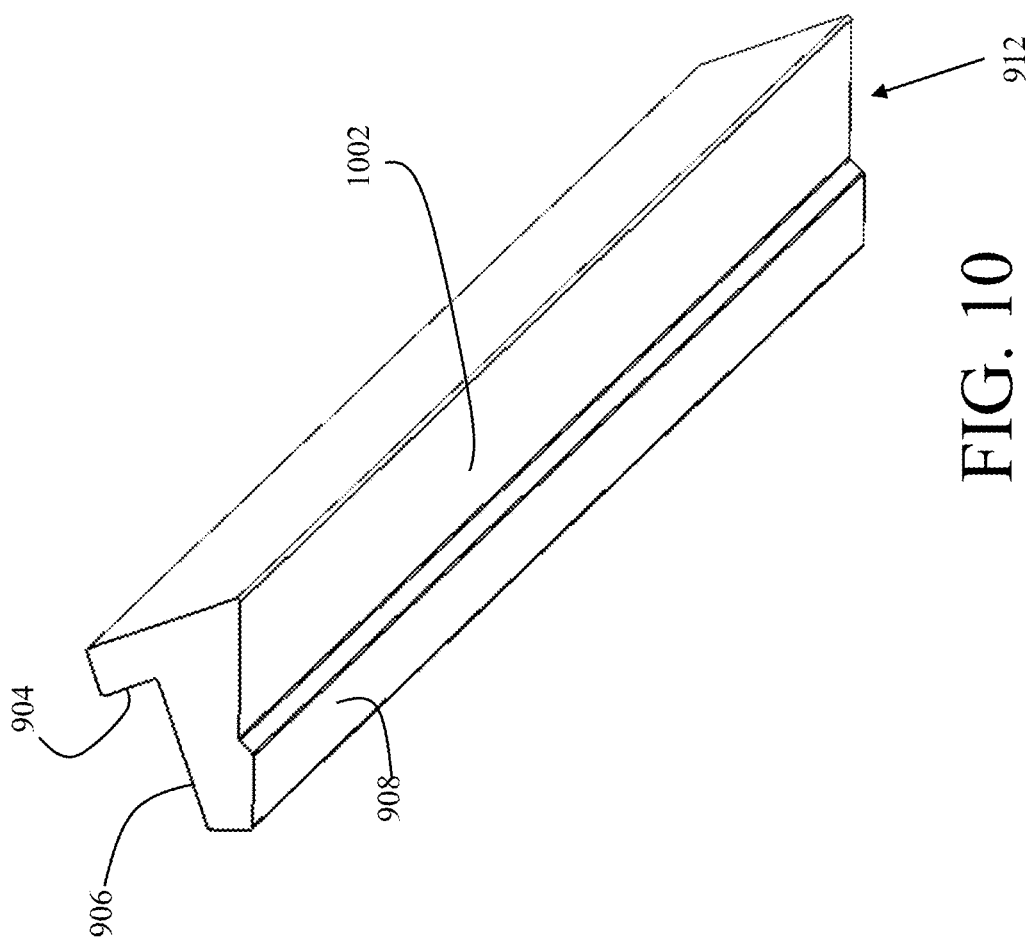

As illustrated in FIG. 9, the compression member 604 may include a side wall 902 and a bottom flange 905 that extends out and angularly from the inner surface 904 of the side wall 902 such that the bottom flange 905 forms an acute inner angle 907 with the side wall 902. Further, the compression member 604 may include a foot 908 that protrudes from a bottom surface 912 of the bottom flange 905 and extends along the length of the compression member 604.

As illustrated in FIGS. 3, 4, 6, and 7, the compression member 604 of each side rail assembly (102a, 102b) may be coupled to the main member 602 of the respective side rail assembly (102a, 102b) using fasteners 314. In particular, to couple the compression member 604 to the main member 602, the compression member 604 may be positioned with respect to the main member 602 such that: (a) the inner surface 904 of the side wall 904 of the compression member 604 engages an outer edge 887 of the bottom coupling flange 808 of the main member 602, (b) the top surface 906 of the bottom flange 905 of the compression member 604 engages the bottom surface 889 of the bottom coupling flange 808 of the main member 602, and (c) the foot 908 of the compression member 604 engages the back plate 202 of the light transmission assembly 110. Further, a fastener 314, such as a washer screw assembly, may be inserted in the threaded screw slot 810 of the main member 602, where the washer may be engage the top coupling flange 806 of the main member 602 and an outer surface of the side wall 902 of the compression member 604. Then, the screw of the washer screw assembly may be tightened to couple the compression member 604 to the main member 602 of the respective side rail assembly (102a, 102b). As the screw is tightened (i.e., the coupling between the compression member 604 to the main member 602 is tightened), the foot 908 of the compression member 604 pushes down and applies a vertical force on the light transmission assembly 110 to provide a compression fit to hold at least the portion of the light transmission assembly 110 disposed in the light assembly cavity 814 securely within the respective side rail assembly (102a, 102b). Further, as described above, the vertical force holds the components (202, 614, 608, 606, 112) that form the light transmission assembly 110 together and prevents an undesirable movement of the light transmission assembly 110 in the X-direction (vertical) and an undesirable movement in the Y-direction (i.e., in-out/normal to page).

Further, as illustrated in FIGS. 2-4 and 6, the modular luminaire 100 may include coupling brackets 206 that are configured to hold the two side rail assemblies (102a, 102b) together. The coupling brackets 206 may be coupled to both the side rail assemblies (102a, 102b) using fasteners 314 and may be disposed at both the lateral ends (103a, 103b) of the modular luminaire 100. In particular, as illustrated in FIGS. 3 and 4, each coupling bracket 206 may include a base 304, two side flanges 306 that extend angularly and away from the base 304 from opposite short ends of the base 304, and a fastening flange 302 that extends substantially perpendicular to the base 304 from a long end that is disposed between the two opposing short ends of the base 304. Further, each coupling bracket 206 may include mounting flanges 310 that protrude vertically from the base 304, and one or more draw latches 1302 (shown in FIG. 15) disposed between the mounting flanges 310 on the base 304.

The fastening flange 302 of the coupling bracket 206 may include fastening apertures 359 that are formed therein. The fastening apertures 359 may be configured to receive fasteners therethrough to provide an alternate mechanism to couple the modular luminaire 100 with another modular luminaire (e.g., 100b) for continuous row mounting. That is, as an alternative to using the alignment rods 308 and the draw latches 1302, modular luminaires may be row mounted by passing fasteners through the fastening apertures 359 of the fastening flanges 302 associated with the coupling brackets 206 that are disposed at the adjoining lateral edges of the modular luminaires that are to be row mounted.

The mounting flanges 310 of each coupling bracket 206 may include a mounting hole 312 that is configured to receive appropriate mounting features therethrough for suspension mounting the modular luminaire 100. Alternatively, the threaded cavity 810 and/or the alignment slot 620 of the main member 602 of each side rail assembly (102a, 102b) may be configured to receive appropriate mounting features therein for suspension or recess mounting the modular luminaire 100, such as, but not limited to, mousetrap springs, torsion springs, etc. Further, each of the side flanges 306 of the coupling bracket 206 may include apertures formed therein, where the apertures are configured to receive fasteners 314 therethrough to couple the coupling bracket 206 to the side rail assemblies (102a, 102b).

In particular, to couple the coupling bracket 206 to the side rail assemblies (102a, 102b), the coupling bracket 206 may be positioned on the back plate 202 of the light transmission assembly 110 such that: (a) an aperture of one of the side flanges 306 of the coupling bracket 206 is axially aligned with a threaded cavity 810 of the first side rail assembly 102a, (b) an aperture of the opposite side flange 306 of the coupling bracket 206 is axially aligned with the threaded cavity 810 of the second side rail assembly 102b, and (c) the fastening flange 302 is disposed adjacent a lateral edge (103a or 103b) of the modular luminaire 100. Responsive to positioning the coupling bracket 206 on the back plate 202 as described above, fasteners 314 may be passed through the axially aligned aperture of each side flange 306 of the coupling bracket 206 and the threaded cavity 810 of the respective side rail assembly (102a, 102b) to couple the coupling bracket 206 to the side rail assemblies (102a, 102b).

Returning to FIG. 8, the main member 602 of each side rail assembly (102a, 102b) may include a plate coupling hole 622 that is formed therein. In one example embodiment, the plate coupling hole 622 may be a through hole that extends from the first lateral end 103a of the main member 602 through the opposite second lateral end 103b of the main member 602. Alternatively, in another example embodiment, the plate coupling hole 622 may be a blind hole that is formed at both the lateral ends (103a, 103b) of the main member 602 of each side rail assembly (102a, 102b). In either case, the plate coupling hole 622 may be configured to receive a fastener 106 (shown in FIG. 1) therethrough to couple end plates 104a and 104b to the lateral ends (103a, 103b) of the side rail assemblies (102a, 102b).

The end plates 104a and 104b may be coupled to the side rail assemblies (102a, 102b) in a standalone configuration of the modular luminaire 100 to cover the lateral ends (103a, 103b) of the modular luminaire 100 as illustrated in FIG. 1. In other example embodiments where the modular luminaire 100 is row mounted with other modular luminaires as illustrated in FIGS. 13-15 and 18-19, one or both the end plates (104a, 104b) may be removed from the modular luminaire 100 to allow the modular luminaire 100 to be coupled to other modular luminaires of the same kind (e.g., 100b or 1600) at one or both the lateral ends (103a and/or 103b) of the modular luminaire 100. In particular, as illustrated in FIGS. 13-15, in a row mounting configuration, a lateral end 103a of an example first modular luminaire 100a may be coupled to the lateral end 103c of an example second modular luminaire 100b.

As illustrated in FIGS. 13-15, to row mount the example first luminaire 100a with the example second luminaire 100b, the lateral end 103a of the example first modular luminaire 100a may be aligned with the lateral end 103c of the example second modular luminaire 100b such that: (a) the alignment slot 620 of the first side rail assembly 102a of the example first modular luminaire 100a is axially aligned with the alignment slot 620 of the first side rail assembly 102c of the example second modular luminaire 100b, (b) the alignment slot 620 of the second side rail assembly 102b of the example first modular luminaire 100a is axially aligned with the alignment slot 620 of the second side rail assembly 102d of the example second modular luminaire 100b, and (c) the coupling bracket 206a of the example first modular luminaire 100a is aligned with and faces the coupling bracket 206b of the example second modular luminaire 100b.

Once the example first and second modular luminaires (100a, 100b) are positioned as described above, the alignment rod fasteners 402 of the alignment rods 308a and 308b disposed in the alignment slots 620 of the first side rail assembly 102c of the second modular luminaire 100a and the second side rail assembly 102b of the first modular luminaire 100a may be loosened. Then, the alignment rod 308a that is disposed in the alignment slot 620 of first side rail assembly 102c of the second modular luminaire 100b may be guided (slid) into the alignment slot 620 of first side rail assembly 102a of the first modular luminaire 100a such that a portion of the alignment rod 308a is disposed in the alignment slot 620 of first side rail assembly 102c of the second modular luminaire 100b while a remainder portion of the alignment rod 308b is disposed in the alignment slot 620 of first side rail assembly 102c of the second modular luminaire 100b. Similarly, the alignment rod 308b that is disposed in the alignment slot 620 of second side rail assembly 102b of the first modular luminaire 100a may be guided (slid) into the alignment slot 620 of second side rail assembly 102d of the second modular luminaire 100b. Then, the alignment rod fasteners 402 associated with the alignment rods 308a and 308b are tightened to securely hold the alignment rods 308a and 308b in place. Furthermore, the draw latch 1302 may be locked or latched to complete a row mounting of the example first and second modular luminaires (100a, 100b) as illustrated in FIGS. 13 and 14.

In other words, modular luminaires that are to be row mounted are positioned such that one side rail assembly of one modular luminaire is axially aligned with one side rail assembly of another modular luminaire while an opposite side rail assembly of the one modular luminaire is axially aligned with an opposite side rail assembly of the other modular luminaire. Further, at least one alignment rod of each modular luminaire is adjusted such that the at least one alignment rod is disposed in the alignment slots of the axially aligned side rail assemblies of both the modular luminaires. Furthermore, the draw latches of the both the modular luminaires are latched or locked to row mount the modular luminaires.

Even though the coupling brackets 206 illustrated in FIG. 15 does not include the fastening flange 302, one of skill in the art can understand and appreciate that in other example embodiments, the coupling brackets may include the fastening flange with a notch formed therein for enabling the hook end of a draw latch of the example first modular luminaire 100a to be coupled to the latch end of another draw latch of the example second modular luminaire 100b.

In one example embodiment, the hook side of the draw latch 1302 may be disposed on the coupling bracket 206a of the example first modular luminaire 100a and the latch side of the draw latch 1302 may be disposed on the coupling bracket 206b of the example second modular luminaire 100b, or vice-versa. In another example embodiment, the coupling brackets 206a and 206b of each of the example first and second modular luminaires (100a, 100b) may comprise both the hook side and the latch side of the draw latch 1302.

Figure 11:
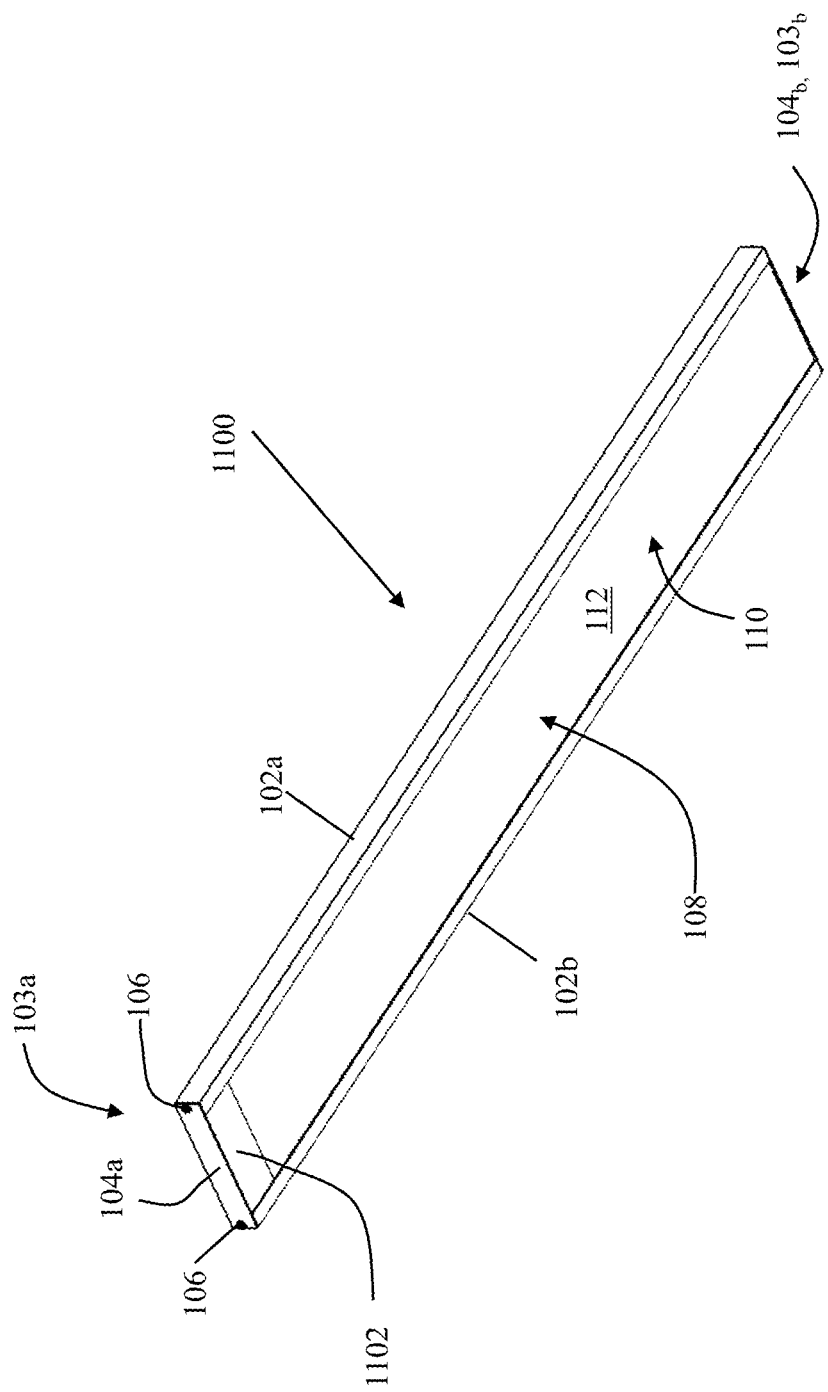
FIGS. 11 and 12 illustrate perspective views of another example row mountable modular flat panel luminaire and a sensor bracket of the row mountable flat panel luminaire, in accordance with example embodiments of the present disclosure.
Figure 12:
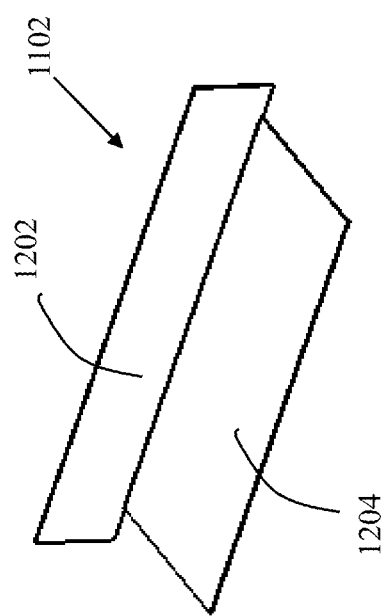

As illustrated in FIG. 11, in some example embodiments, the modular luminaire 1100 may include a sensor plate 1102 that is coupled to and disposed at a lateral end 103a of the modular luminaire 1100. The sensor plate 1102 may be configured to couple one or more sensors to the modular luminaire 1100. As illustrated in FIG. 12, the sensor plate 1102 may include a side flange 1202 and a sensor coupling flange 1204 that is substantially perpendicular to the side flange 1202. The sensor plate 1102 may be coupled to the modular luminaire 1100 such that the sensor coupling flange 1204 is disposed in the light emitting aperture 108 and below the light transmission assembly 110. Notches or openings may be formed in the light transmission assembly 110 and sensor coupling flange 1204 of the sensor plate 1102 to receive a sensor therethrough such that a sensing element of the sensor is exposed to the area to be illuminated. The sensor may include, but is not limited to, a motion sensor, camera, etc. In other example embodiments, the sensor plate 1102 may be configured to couple any other appropriate electrical or electronic device to the modular luminaire 100. For example, the sensor plate 1102 may be configured to support and couple an emergency test switch to the modular luminaire 100.

Figure 16:
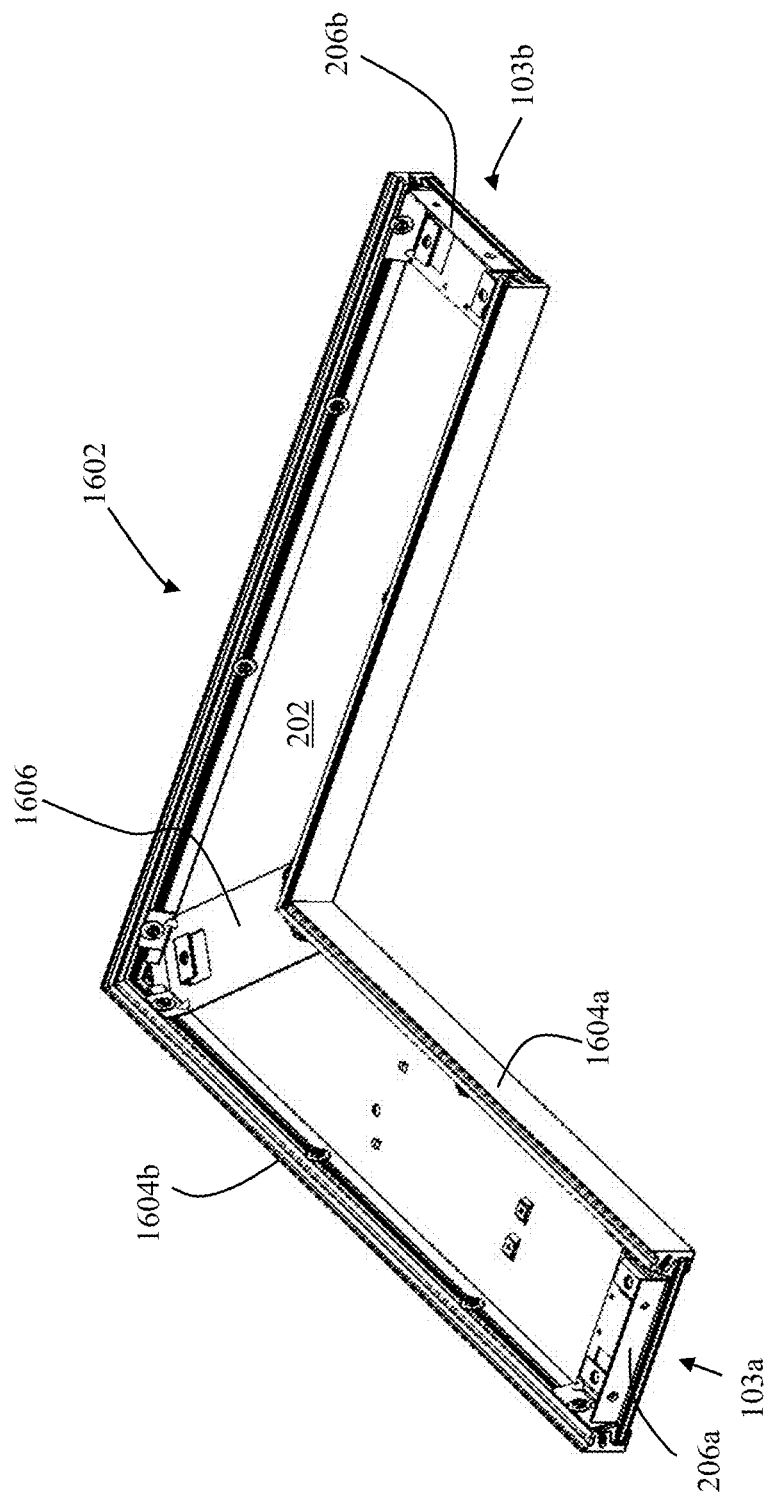
FIGS. 16 and 17 illustrate perspective views of yet another example row mountable modular flat panel luminaire that is substantially L-shaped, in accordance with example embodiments of the present disclosure.
Figure 17:
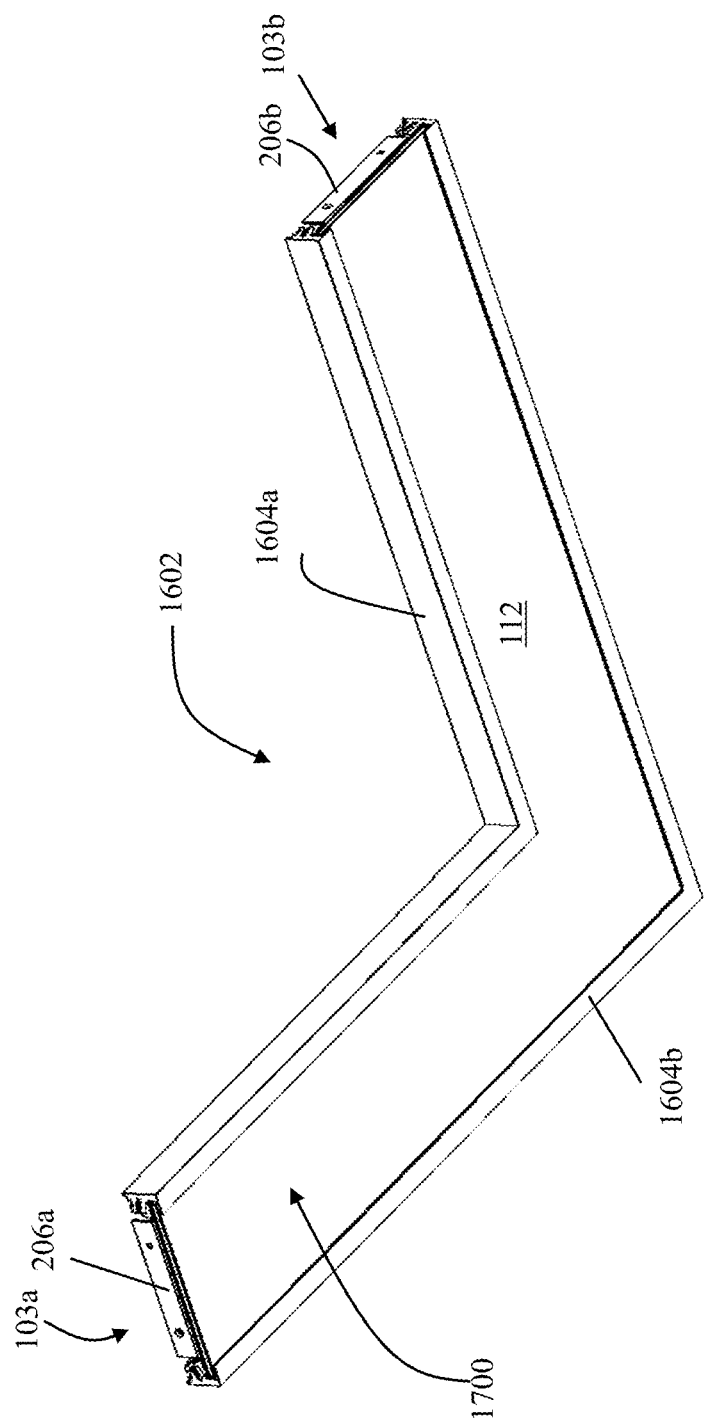
Figure 18:
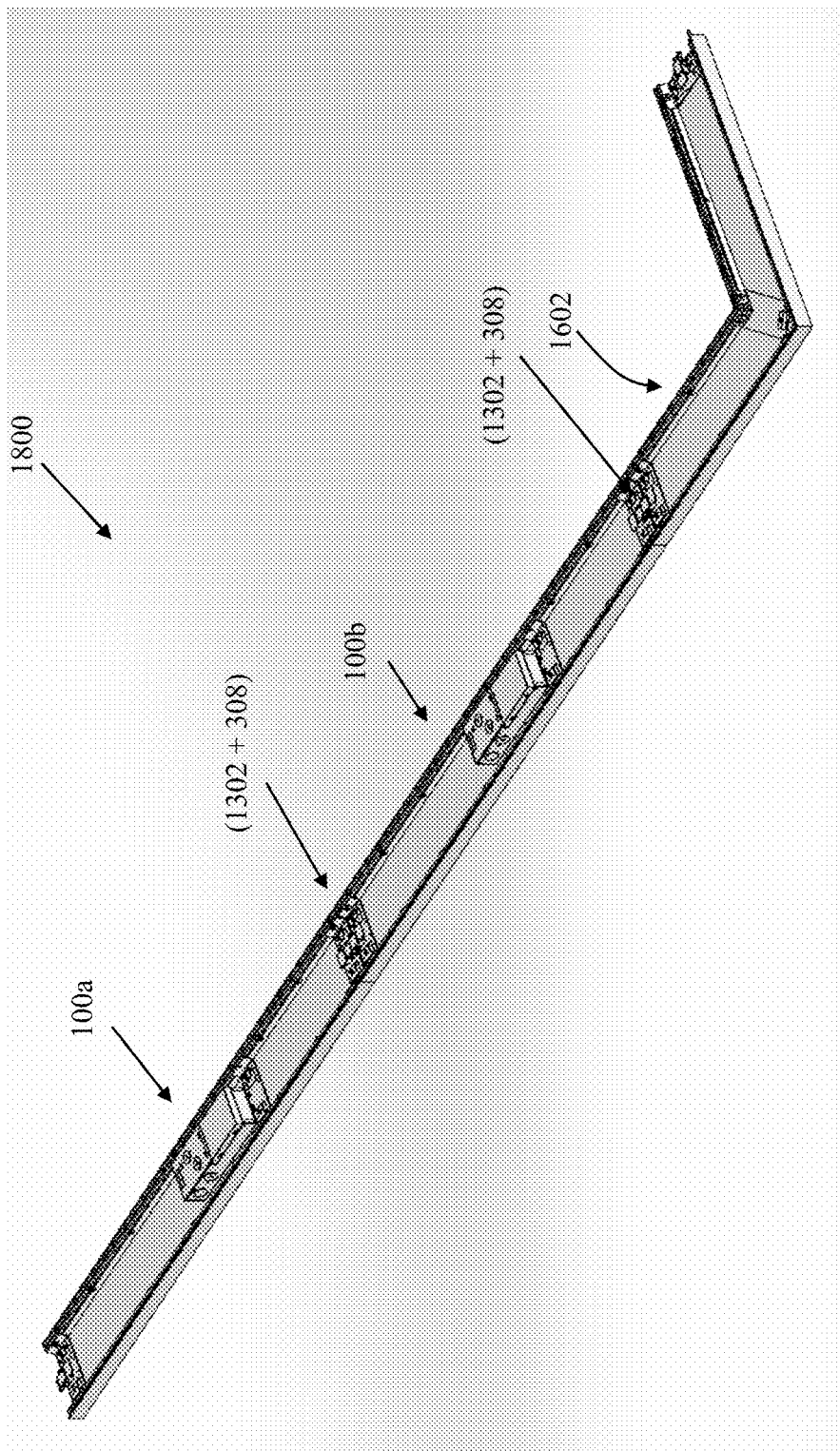
FIGS. 18 and 19 illustrate different perspective views of another example row mount assembly comprising three row mountable modular flat panel luminaires that are in a row mounted configuration, in accordance with example embodiments of the present disclosure.
Figure 19:
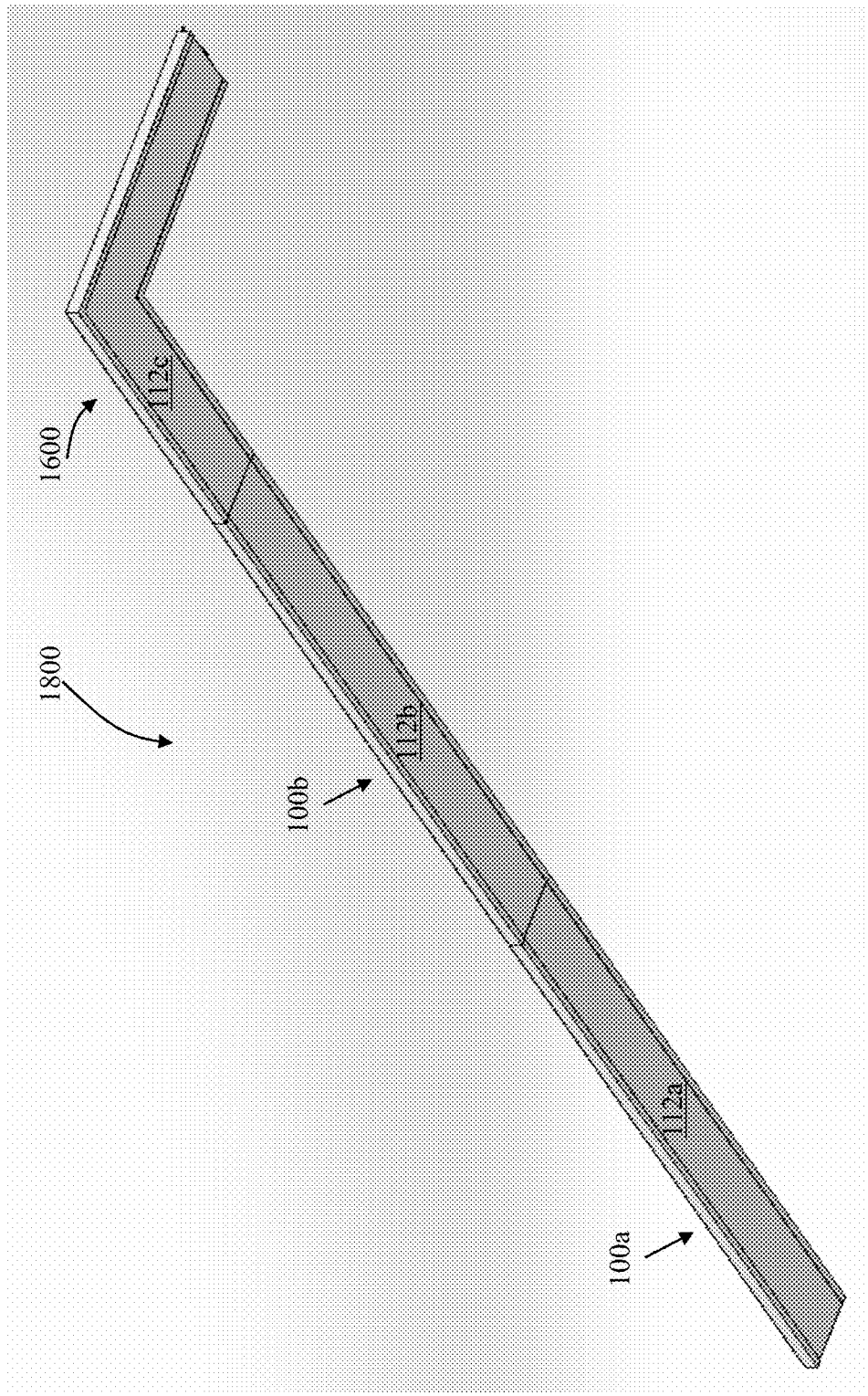
Figure 20:
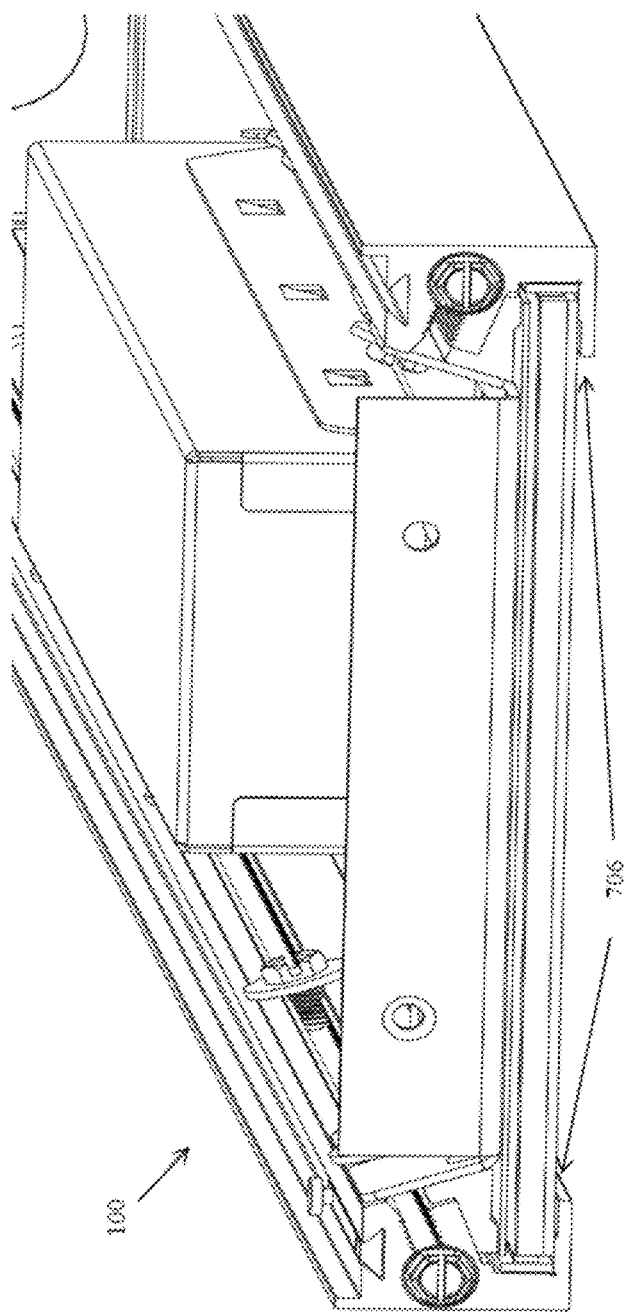
FIG. 20 illustrates a different perspective view of the row mountable flat panel luminaire of FIG. 1, in accordance with example embodiments of the present disclosure.

Even though FIGS. 1-15 illustrate the modular luminaires of the present disclosure as having a substantially rectilinear shape, one of skill in the art can understand and appreciate that in other example embodiments the modular luminaire may have any other appropriate shape without departing from a broader scope of the present disclosure. For example, as illustrated in FIGS. 16-17, the modular luminaire 1602 may be L-shaped, where the side rail assemblies (1604a, 1604b) and the light transmission assembly 1700 of the modular luminaire 1602 that is disposed in between the side rail assemblies (1604a, 1604b) are substantially L-shaped. Further, as illustrated in FIGS. 18 and 19, a rectilinear shaped modular luminaire 100 may be row mounted with an L-shaped modular luminaire 1602 without departing from a broader scope of the present disclosure. The coupling or row mounting of the rectilinear shaped modular luminaire 100 with the L-shaped modular luminaire 1602 may be substantially similar to the coupling of two rectilinear modular luminaires (e.g., 100a, 100b) as described above and as illustrated in FIG. 15. Therefore, the coupling or row mounting of the rectilinear shaped modular luminaire 100 with the L-shaped modular luminaire 1602 will not be repeated herein for the sake of brevity.

Figure 21:
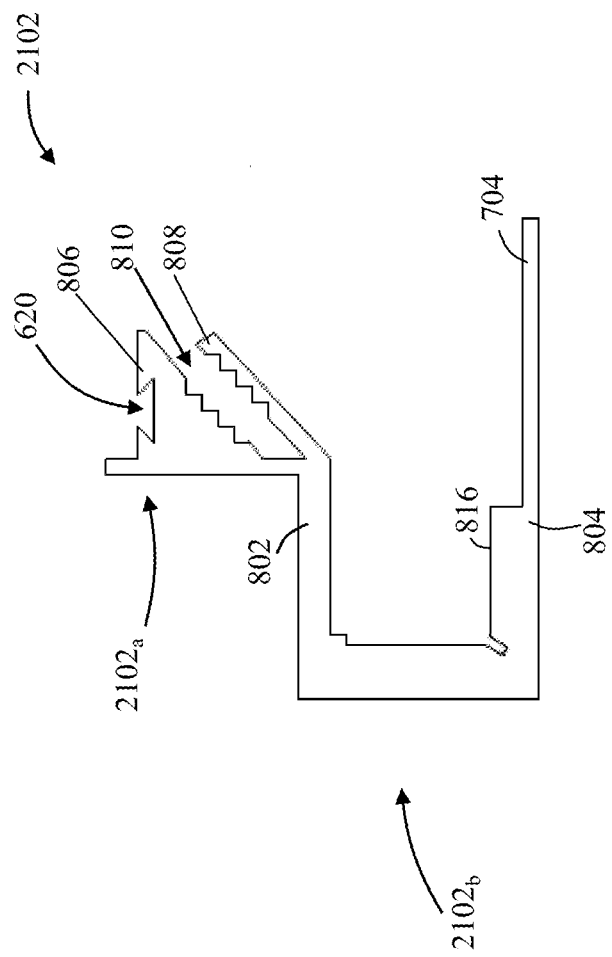
FIG. 21 illustrates another example embodiment of a main member of a side rail assembly of the row mountable modular flat panel luminaire, in accordance with example embodiments of the present disclosure.

Further, even though FIGS. 1-4, 6, 8, 11, and 13-20 illustrate the main member 602 of each side rail assembly (102a, 102b, 1604a, 1604b) having a specific shape, one of skill in the art can understand and appreciate that in other example embodiments, the main member 602 and/or compression member 604 may have a different shape without departing from the broader scope of the present disclosure. For example, as illustrated in FIG. 21, the main member 2102 may be shaped such that the thickness of the modular luminaire that extends below the ceiling after installation may be reduced. The modular luminaire 100 that is illustrated in FIGS. 1-4, 6, 8, 11, and 13-20 may be installed in the ceiling such that the top edge 801 of the main member 602 of each side rail assembly (102a, 102b) of the modular luminaire 100 engages the ceiling and the full thickness of the main member 602 of the side rail assemblies (102a, 102b) of the modular luminaire 100 protrudes below the ceiling. The height of the main member 602 illustrated in FIGS. 1-4, 6, 8, 11, and 13-20 may be approximately 1 inch. As such, when a modular luminaire as illustrated in FIGS. 1-4, 6, 8, 11, and 13-20 is installed in the ceiling, the full thickness of the modular luminaire 100, i.e., 1 inch of the modular luminaire extends below the ceiling. However, when the main member 602 of the side rail assemblies (102a, 102b) of the modular luminaire 100 is replaced with the main member 2102 as illustrated in FIG. 21, only the bottom portion 2102b of the main member 2102 extends below the ceiling while the remaining top portion 2102a is disposed in an aperture in the ceiling, thereby reducing the thickness of modular luminaire that protrudes below the ceiling. This in turn provides a thinner appearance to the modular luminaire. The thickness of the bottom portion 2102 may be ½ inch. So, only ½ inch of the modular luminaire may extend or protrude below the ceiling.

Furthermore, even though the present disclosure describes a modular luminaire having a width 'w' (shown in FIG. 2) that is approximately 6 inches, one of skill in the art can understand and appreciate that in other example embodiments, the modular luminaire may be wider or narrower without departing from a broader scope of the present disclosure. For example, the modular luminaire may have a width 'w' of approximately 4 inches, 2 inches, or 8 inches. The width of the light transmission assembly 110, the optical film, and the shape of the coupling brackets 206 may vary based on the width of the modular luminaire 100. Similarly, the modular luminaire can have different lengths. For example, the length and widths of the different modular luminaires may include, but are not limited to, 4 feet*6 inches, or 2 feet*6 inches, or 4 feet*4 inches, 2 feet*4 inches, etc.

Although the present disclosure is described with reference to example embodiments, it should be appreciated by those skilled in the art that various modifications are well within the scope of the present disclosure. From the foregoing, it will be appreciated that an embodiment of the present disclosure overcomes the limitations of the prior art. Those skilled in the art will appreciate that the present disclosure is not limited to any specifically discussed application and that the embodiments described herein are illustrative and not restrictive. From the description of the example embodiments, equivalents of the elements shown therein will suggest themselves to those skilled in the art, and ways of constructing other embodiments of the present disclosure will suggest themselves to practitioners of the art. Therefore, the scope of the present disclosure is not limited herein.

What is claimed is:

1. A luminaire comprising:
   a housing assembly that defines an inner cavity and a light emitting opening, the housing assembly having a long side that defines a length of the luminaire and a short side that defines a width of the luminaire;
   a light assembly that is disposed in the inner cavity of the housing assembly, the light assembly comprising a light source and a light transmission unit that are arranged such that light from the light source enters a lightguide panel of the light transmission unit through an edge of the lightguide panel and exits the luminaire through a major surface of the lightguide panel that is substantially perpendicular to the edge and through the light emitting opening of the housing assembly; and grid clips disposed on a back plate of the housing assembly of the luminaire such that the luminaire is configured for a recessed installation, wherein each grid clip of the grid clips comprises a hook, wherein the luminaire is configured such that the length of the luminaire is greater than the width of the luminaire, while a height of the luminaire measured from a bottom surface of the housing assembly to a top surface of the housing assembly is less than the width of the luminaire and a width of an installation aperture of a recessed installation structure through which the luminaire is to be inserted for mounting the luminaire in the recessed installation structure, the recessed installation structure comprising vertical members joined to horizontal members, wherein the hook of each grid clip fits onto a vertical member of the vertical members and each side of a front of the housing assembly rests on a horizontal member of the horizontal members, and wherein the width of the luminaire is less than 1 foot.

2. The luminaire of claim 1, wherein the height of the luminaire ranges from 2 to 3 inches.

3. The luminaire of claim 1, wherein the housing assembly comprises a pair of alignment slots on the back plate of the housing assembly, each alignment slot of the pair of alignment slots configured to receive an alignment rod that aligns an adjacent luminaire.

4. The luminaire of claim 1, wherein the width of the luminaire is 4 inches.

5. The luminaire of claim 1, wherein the width of the luminaire is 6 inches.

6. The luminaire of claim 1, wherein the light transmission unit comprises a reflector panel, the lightguide panel, and a diffuser panel; and wherein the lightguide panel is disposed between the reflector panel and the diffuser panel.

7. The luminaire of claim 1, wherein the housing assembly comprises a front frame that defines the light emitting opening and the back plate that is coupled to the front frame.

8. The luminaire of claim 7:
wherein the luminaire further comprises a power control device disposed on the housing assembly and configured to control electrical power to the light source,
wherein the power control device is mounted on the back plate, and
wherein a height of the power control device is less than the width of the luminaire such that when the power control device is mounted on the back plate, a total height of the luminaire measured from the bottom surface of the housing assembly to a top surface of the power control device is less than the width of the luminaire and the width of the installation aperture of the recessed installation structure through which the luminaire is to be inserted for mounting the luminaire in the recessed installation structure.

9. The luminaire of claim 8, wherein the light source comprises one or more light emitting diodes; and wherein the power control device is a light emitting diode driver.

10. The luminaire of claim 8, wherein the power control device is an emergency battery pack.

11. The luminaire of claim 8, wherein the power control device is an electrical ballast.

12. A method comprising:
providing a luminaire that is configured for recessed installation and comprising a housing assembly that defines an inner cavity that is configured to house a light assembly therein, the light assembly comprising a light source and a light transmission unit that are arranged such that light from the light source enters a lightguide panel of the light transmission unit through an edge of the lightguide panel and exits the luminaire through a major surface of the lightguide panel that is substantially perpendicular to the edge,
the housing assembly having grid clips disposed on a back plate of the housing assembly of the luminaire such that the luminaire is configured for a recessed installation, wherein each grid clip of the grid clips comprises a hook,
wherein a length of the luminaire that is defined by a long side of the luminaire is greater than a width of the luminaire that is defined by a short side of the luminaire, while a height of the luminaire measured from a bottom surface of the housing assembly of the luminaire to a top surface of a power control device disposed on the housing assembly is less than the width of the luminaire and a width of an installation aperture of a recessed installation structure, the recessed installation structure comprising vertical members joined to horizontal members, wherein the hook of each grid clip fits onto a vertical member of the vertical members and each side of a front of the housing assembly rests on a horizontal member of the horizontal members.

13. The method of claim 12, wherein the height of the luminaire ranges from 2 to 3 inches.

14. The method of claim 12, wherein the housing assembly comprises a pair of alignment slots on the back plate of the housing assembly, each alignment slot of the pair of alignment slots configured to receive an alignment rod that aligns an adjacent luminaire.

15. The method of claim 12, wherein the width of the luminaire is 4 inches.

16. The method of claim 12, wherein the width of the luminaire is 6 inches.

17. The method of claim 12, wherein the light transmission unit comprises a reflector panel, the lightguide panel, and a diffuser panel; and wherein the lightguide panel is disposed between the reflector panel and the diffuser panel.

18. The method of claim 12, wherein the light source comprises one or more light emitting diodes; and wherein the power control device is a light emitting diode driver.

* * * * *